United States Patent
Eitelhuber

(12) 
(10) Patent No.: US 10,530,295 B2
(45) Date of Patent: Jan. 7, 2020

(54) SYSTEM AND METHOD FOR CONVEYING AN ASSEMBLY

(71) Applicant: KING ABDULLAH UNIVERSITY OF SCIENCE AND TECHNOLOGY, Thuwal (SA)

(72) Inventor: Georg Eitelhuber, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 328 days.

(21) Appl. No.: 15/319,754

(22) PCT Filed: Jun. 18, 2015

(86) PCT No.: PCT/IB2015/001619
§ 371 (c)(1),
(2) Date: Dec. 16, 2016

(87) PCT Pub. No.: WO2015/193732
PCT Pub. Date: Dec. 23, 2015

(65) Prior Publication Data
US 2017/0179873 A1  Jun. 22, 2017

Related U.S. Application Data

(60) Provisional application No. 62/014,253, filed on Jun. 19, 2014, provisional application No. 62/014,251,
(Continued)

(51) Int. Cl.
*B08B 1/04* (2006.01)
*H02S 40/10* (2014.01)
(Continued)

(52) U.S. Cl.
CPC .............. *H02S 40/10* (2014.12); *A46B 9/026* (2013.01); *A46B 13/02* (2013.01); *B08B 1/002* (2013.01);
(Continued)

(58) Field of Classification Search
CPC .. H02S 40/10; H02S 4/12; F24S 40/20; A46B 9/026; A46B 13/02; B08B 1/002;
(Continued)

(56) References Cited

U.S. PATENT DOCUMENTS 5,323,508 A * 6/1994 Sheldrake .................. A47L 1/02
15/103
6,991,262 B1 * 1/2006 Ragner ...................... A47L 9/06
15/417
(Continued)

FOREIGN PATENT DOCUMENTS

DE  10 2010 038858 A1  2/2010
WO  2004/091816 A1  10/2004

OTHER PUBLICATIONS

International Search Report dated Feb. 16, 2016, issued in International Application No. PCT/IB2015/001619.
(Continued)

*Primary Examiner* — Shay Karls
(74) *Attorney, Agent, or Firm* — Patent Portfolio Builders PLLC

(57) ABSTRACT

Cleaning system (100) including a brush assembly (102) for cleaning solar panels (106). The brush assembly has at least one rotatable brush (403) having a rotational axis. The rotatable brush includes a plurality of sets of bristles (2004), each extending outwardly from a core (2008). A shaft (2005) extends through the core of the brush. The shaft is a telescoping shaft, which is configured to retract and expand to create an elongated brush assembly. An apparatus, system,
(Continued)

and method for conveying an assembly along a track. A rail (401) includes a first planar side, a second planar side, and a third planar side. The first, second, and third planar sides are arranged to form at least two acute angles ranging between 50 degrees and 80 degrees. A carriage assembly (300) includes a drive wheel (301) and at least two rollers (302). The drive wheel is configured to contact the second planar side and is configured to translate the assembly along the rail. The two rollers are configured to contact the two other sides to maintain the carriage in contact with the rail.

18 Claims, 23 Drawing Sheets

Related U.S. Application Data filed on Jun. 19, 2014, provisional application No. 62/014,240, filed on Jun. 19, 2014, provisional application No. 62/014,227, filed on Jun. 19, 2014, provisional application No. 62/014,248, filed on Jun. 19, 2014.

(51) Int. Cl.
*F16C 29/00* (2006.01)
*F24S 40/20* (2018.01)
*A46B 9/02* (2006.01)
*A46B 13/02* (2006.01)
*B08B 1/00* (2006.01)

(52) U.S. Cl.
CPC ............... *B08B 1/008* (2013.01); *B08B 1/04* (2013.01); *F16C 29/005* (2013.01); *F24S 40/20* (2018.05)

(58) Field of Classification Search
CPC ......... B08B 1/008; B08B 1/04; F16C 29/005; F16C 29/045
See application file for complete search history.

(56) References Cited

U.S. PATENT DOCUMENTS

| | | | |
|---|---|---|---|
| 8,771,432 B2* | 7/2014 | Meller | B08B 1/006 134/56 R |
| 2008/0190461 A1* | 8/2008 | Thorpe | B08B 1/04 134/42 |
| 2013/0037051 A1 | 2/2013 | Eitelhuber | |
| 2013/0097790 A1* | 4/2013 | Liao | A47L 1/02 15/88.4 |
| 2014/0041138 A1 | 2/2014 | Adler | |
| 2014/0363194 A1* | 12/2014 | Iwasaki | G03G 15/0225 399/100 |

OTHER PUBLICATIONS

Written Opinion of the International Searching Authority dated Feb. 16, 2016, issued in International Application No. PCT/IB2015/001619.

Chinese First Office Action in related Chinese Application No. 201580043678.0, dated Jun. 22, 2018 (References 1 and 2 were cited in the IDS filed Dec. 16, 2016).

Examination Report No. 1 for standard patent application in corresponding/related AU Application No. 2015275793, dated Apr. 11, 2019 (Document D1 was cited in the IDS filed Dec. 16, 2016).

* cited by examiner

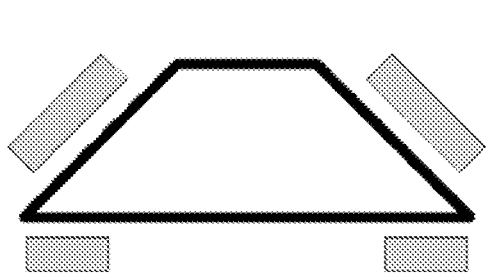
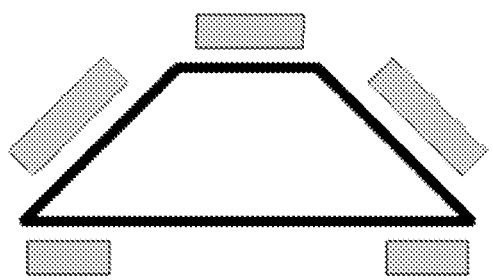
Figure 8A                     Figure 8B
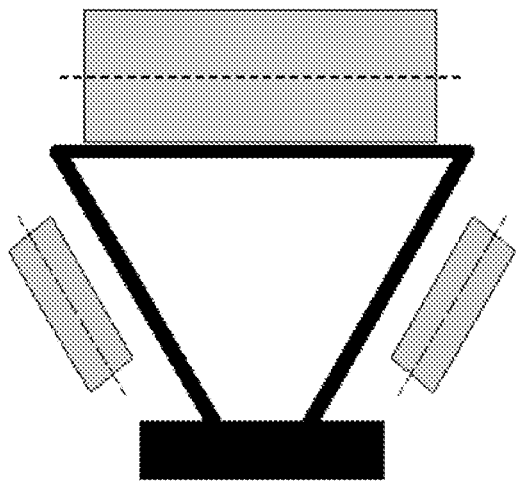
Figure 9
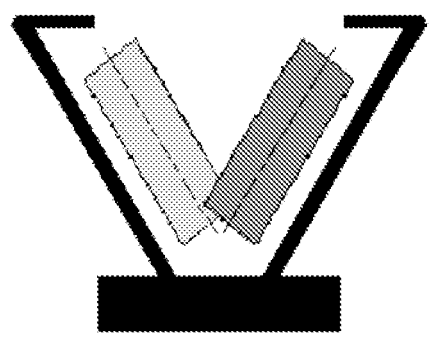
Figure 10

SYSTEM AND METHOD FOR CONVEYING AN ASSEMBLY

CLAIM OF PRIORITY

This application claims the benefit under 35 USC 371 to International Application No. PCT/IB2015/001619, filed Jun. 18, 2015, which claims priority to U.S. Provisional Patent Application No. 62/014,227, filed Jun. 19, 2014; U.S. Provisional Patent Application No. 62/014,240, filed Jun. 19, 2014; U.S. Provisional Patent Application No. 62/014,248, filed Jun. 19, 2014; U.S. Provisional Patent Application No. 62/014,251, filed Jun. 19, 2014; and U.S. Provisional Patent Application No. 62/014,253, filed Jun. 19, 2014, each of which is incorporated by reference in its entirety.

TECHNICAL FIELD

The present invention is directed to a system and method for translating an assembly along a track, such as a duster for dusting a photovoltaic array.

BACKGROUND

The efficiency of a solar panel is measured by the ratio of the amount of sunlight it receives to the amount of electricity it generates. After a solar panel is installed, dust and other debris typically begin to accumulate on the solar panel surfaces. Dust accumulated on a solar panel reduces the number of photons reaching the photovoltaic elements and thereby reduces the power the solar panel can generate during a unit of time. In other words, dust can significantly reduce the efficiency of the solar panel. Therefore, many systems include a solar panel cleaning system to improve the efficiency of solar panels.

Solar panel cleaners in the prior art can be categorized as manual and automated types. Manual cleaners generally include manually operated sweeping brushes, power washers, and powered brushes. Automated cleaners generally include buffer-style and rotating bristle-style devices. Prior rotating bristle-style cleaners generally use a system for translating the brush while the rotational axis of the brush is maintained in an orientation that is perpendicular to the direction of travel. In other words, the top and bottom of the brush sweep across the panel at an even rate without one moving out ahead of the other. Complicated and mechanically inefficient systems are typically required to maintain the rotating brush in a perpendicular orientation as it traverses the solar panels. Changes in temperature and other variables can affect the functioning of such dusters.

Typically, most solar panel cleaning systems also use liquid cleaning solutions or water for cleaning the solar panels. The moistened dust and debris may become sticky and adhere to the surfaces of the solar panel, which can complicate the cleaning process. This is especially true in hot arid regions where solar panels are often found. A further problem with using water in arid regions is in maintaining or supplying water at the site of the solar array.

SUMMARY

In an aspect, a track system can include a rail and a carriage assembly. The rail can include a first planar side, a second planar side, and a third planar side. The first, second, and third planar sides can be arranged to form at least two acute angles. The carriage assembly can include a drive wheel and at least two roller sets. The drive wheel can be configured to contact the first planar side and can be configured to translate the carriage assembly along the rail. A first roller set of the at least two roller sets can be configured to contact the second planar side, and a second roller set of the at least two roller sets can be configured to contact the third planar side.

In some embodiments, the track system can include a motor. The motor can be configured to actuate the drive wheel and translate the carriage assembly. The drive wheel can be a load bearing roller. The carriage assembly can further include a pivot. The pivot can be configured to pivot an attached component. In other embodiments, the drive wheel and the at least two rollers can be configured to maintain the carriage assembly in contact with the rail.

In some embodiments, the rail can be formed of a cold rolled metal, for example cold rolled steel, and/or the rail can be formed of an extruded metal, such extruded aluminum. The at least two rollers can comprise a silicon material, a metal material and/or a polymer material. The rail can be solid or hollow. The rail can include internal support structures and hollow areas.

In another aspect, a conveying method can include the steps of providing a rail, providing a carriage assembly, and translating the carriage assembly along the rail. The rail can include a first planar side, a second planar side, and a third planar side. The first, second, and third planar sides can be arranged to form at least two acute angles. The carriage assembly can include a drive wheel and at least two roller sets. The drive wheel can be configured to contact the first planar side. A first roller set of the at least two roller sets can be configured to contact the second planar side. A second roller set of the at least two roller sets can be configured to contact the third planar side.

In some embodiments, the method can include actuating a motor, causing the drive wheel to translate the carriage assembly. The drive wheel can be a load bearing roller. The drive wheel and the at least two rollers maintain the carriage assembly in contact with the rail.

In embodiments, the method can include pivoting an attached component, such as an assembly. The rail can be formed of a cold rolled metal and/or an extruded metal. The drive wheel and the at least two rollers comprise a silicon material, a metal material, and/or a polymer material.

In an aspect, a cleaning apparatus can include a brush assembly, a drive, and a pivot. The brush assembly can include at least one rotatable brush having a rotational axis. The drive can be configured to translate the brush assembly parallel to a track. The pivot can be configured to pivot the rotational axis in a plane parallel to the track and the rotational axis.

In embodiments, the cleaning apparatus can include a trailing assembly slidably attached to the brush assembly. The trailing assembly can be configured to translate along a second track. The pivot can be configured to allow the brush assembly to pivot in the plane to an angle that is not perpendicular to the track. The angle can be between 30 deg. and 80 deg., between 40 deg. and 75 deg., between 50 deg. and 70 deg., and/or between 55 deg. and 65 deg. The angle can be less than 60 deg.

In some embodiments, the drive wheel can include a drive motor. The brush assembly can include a brush motor configured to rotate the at least one rotatable brush about the rotational axis. The at least one rotatable brush can include a sweeping member. In some embodiments, the sweeping member can have a bristle pattern parallel to the rotational axis. The sweeping member can comprise a polymer, a natural fiber, and/or metal bristles. The sweeping member can comprise a foam or spongy material.

In embodiments, the at least one rotatable brush can include a shaft extending along the rotational axis and a sweeping member coupled to the shaft and configured to be rotatable about the rotational axis. The pivot can be configured to rotate the shaft clockwise and/or counter-clockwise, as well as in a plane parallel to a solar panel or other element such as a window or mirror. The rotational axis is not perpendicular to the direction of the track while the cleaning apparatus is in an operational configuration.

In another aspect, a method of cleaning can include the steps of providing a brush assembly, pivoting the rotational axis of a rotatable brush, and translating the brush assembly parallel to a track. The brush assembly can include at least one rotatable brush having a rotational axis. The plane defined by pivoting the rotational axis can be in a plane parallel to the track.

In some embodiments, the method can include providing a trailing assembly slidably attached to the brush assembly and translating the trailing assembly along a second track. In other embodiments, the method can include pivoting the brush assembly in the plane to an angle that is nonperpendicular to the track. The angle can be between 30 deg. and 80 deg., between 40 deg. and 75 deg., between 50 deg. and 70 deg., and/or between 55 deg. and 65 deg. The angle can be less than 60 deg.

In other embodiments, the method can include operating a brush motor to rotate the at least one rotatable brush about the rotational axis. The at least one rotatable brush can include a sweeping member having a bristle pattern parallel to the rotational axis.

In an aspect, a photovoltaic array can include a rail and a solar panel mounted to the rail. The rail can include a first planar side, a second planar side, and a third planar side. The first, second, and third planar sides can be arranged to form at least a first acute angle and a second acute angle.

In some embodiments, the rail can be formed of a cold rolled metal and/or an extruded metal.

In some embodiments, the array can further include a carriage assembly and a brush assembly. The carriage assembly can include a pivot, a drive wheel, and at least two roller sets. The brush assembly can include at least one rotatable brush having a rotational axis. The brush assembly can be pivotally attached to the carriage assembly.

In other embodiments, the drive wheel can be configured to contact the first planar side and can be configured to translate the carriage assembly along the rail. A first roller set of the at least two roller sets can be configured to contact the second planar side. A second roller set of the at least two roller sets can be configured to contact the third planar side.

In yet other embodiments, the solar panel can be further mounted to a second rail. The rail and the second rail can be in a plane substantially parallel to a solar panel. The second rail can include three planar sides arranged to form at least a third acute angle and a fourth acute angle.

In some embodiments, the array can include a trailing carriage assembly slidably attached to the brush assembly. The trailing carriage can include at least three roller sets. The at least three roller sets include at least one drive wheel.

In other embodiments, the rotational axis can be nonperpendicular to the rail when the photovoltaic array is in an operational configuration.

In yet other embodiments, the array can include a housing for containing a brush assembly. The brush assembly can include at least one rotatable brush having a rotational axis. The brush assembly can be pivotally attached to a carriage assembly.

In some embodiments, the array can include a mounting frame configured to maintain the solar panel in relation to the rail. The mounting frame can include a c-shape cross section and a material for securing the solar panel. The material can be a polymer, an elastomer, an adhesive, and/or a resin.

In an aspect, a track system can include a channel and a carriage. The channel can include a first planar side and a second planar side. The first and second planar sides can be arranged at an acute angle. The carriage assembly can include a drive wheel and at least two rollers. The drive wheel can be in contact with the first planar side and can be configured to translate the carriage assembly along the channel. At least one of the at least two rollers can be in contact with the second planar side.

In some embodiments, the carriage assembly can further include a pivot. In other embodiments, the track system can include a means for dust abatement. The means for dust abatement can include a flexible hood and/or bristles, for instance, along the top of the channel. The means can include egress apertures along the bottom and/or sides of the channel. Additionally, a skirt around the pivot and sliding members can be utilized to prevent dust and debris from falling into the channel. Further, the assembly components can be disposed in a housing to seal them from dust and dirt.

In other embodiments, the system can include a brush assembly. The brush assembly can include one or more rotatable brushes, each having a rotational axis. The pivot can be configured to pivot the brush assembly.

In yet other embodiments, the system can include a panel. The panel can be a photovoltaic solar panel, a window, and/or a mirror. The panel can be mounted to the channel. The top of the channel can be substantially flush with the panel. The pivot can be configured to allow pivoting the rotational axis in a plane parallel to the panel. The carriage assembly can be configured to translate the brush assembly in a direction that is nonperpendicular to the rotational axis.

In another aspect, a method of conveying can include the steps of providing a channel, providing a carriage assembly, and translating the carriage assembly along the channel. The channel can include a first planar side, a second planar side, and an open face. The first and second planar sides can be arranged at an acute angle. The carriage assembly can include a drive wheel and at least two rollers. The drive wheel can be in contact with the first planar side. At least one of the at least two rollers can be in contact with the second planar side.

In some embodiments, the carriage assembly can further include a pivot. The method can further include abating dust ingress into the channel.

In other embodiments, the method can include providing a brush assembly and pivoting the brush assembly. The brush assembly can include one or more rotatable brushes each having a rotational axis.

In yet other embodiments, the open face of the channel can be substantially flush with a panel. The method can further include pivoting the rotational axis in a plane parallel to the panel, and translating the brush assembly in a direction that is nonperpendicular to the rotational axis.

In other embodiments, the method can include providing a brush assembly and pivoting the brush assembly. The brush assembly can include one or more rotatable brushes each having a rotational axis.

In other embodiments, the cleaning system may include a brush assembly for cleaning the solar panels. The brush assembly may include a brush having one or more bristles extending outwardly from a core. A shaft may extend through the core of the brush. The shaft may be a telescoping shaft, which is configured to retract and expand to create an elongated brush assembly.

In other embodiments, the track may include a rail comprising a first planar side, a second planar side, and a third planar side, wherein the first, second, and third planar sides are arranged to form at least two acute angles. An assembly may include a drive wheel and at least two rollers, wherein the drive wheel is configured to contact the second planar side and is configured to translate the assembly along the rail. A bracket may engage an underside of the rail. The rail may be configured to snap on to the bracket, and a first roller of the at least two rollers is configured to contact the first planar side, and a second roller of the at least two rollers is configured to contact the third planar side and hold the assembly on the rail.

In other embodiments, a carriage assembly may include a bracket having a first side, a second side, and a third side. A shaft may extend between the second side and third side, parallel to the first side of the bracket. The shaft may include a drive roller and a drive motor. A pair of rollers may be attached to the second and third ends of the bracket. The pair of rollers may be configured to attach the carriage assembly to the rail, while the drive roller may be configured to translate the carriage assembly along the rail. The rail may be any suitable shape or size, and may include generally triangular shaped ends or may be generally U-shaped.

In other embodiments, the rail may be formed from a first side, a second side, and a third side. The first side, second side, and third side may form a generally triangular shape having an open cross-section and may define two acute angles. An acute angle may be formed between the first side and the second side, ranging between 30 and 85 degrees. An acute angle may be formed between the second side and the third side ranging between 30 and 85 degrees. The rail may also include a bottom member and an angled member, such that it the third side, bottom member and angled member form a triangle.

In other embodiments, a cleaning apparatus may have a brush assembly including at least one rotatable brush having a rotational axis. The at least one rotatable brush may include a core defining a plurality of sockets. One or more brush bristles may extend from each of the plurality of sockets. The one or more brush bristles may be removably attached to the plurality of sockets. The cleaning apparatus may also include a drive configured to translate the brush assembly parallel to a track.

In other embodiments, a brush assembly may include at least one rotatable brush having a rotational axis. The at least one rotatable brush may include a core and a plurality of sets of bristles extending outwardly from the core. The brush assembly may also include a rotational cover surrounding at least a portion of the brush assembly. The rotational cover may rotate around the brush assembly based on the direction of the rotation of the brush assembly. An area of high pressure may be formed between a first set of bristles, which are in a flexed position and a second set of bristles in an un-flexed position. An area of atmospheric pressure may be formed between two sets of bristles both in an un-flexed position. An area of low pressure may be formed between the first set of bristles and the second set of bristles as the first set of bristles moves from a flexed to an un-flexed position.

BRIEF DESCRIPTION OF THE DRAWINGS

Embodiments are further described in the detailed description which follows, in reference to the noted plurality of drawings by way of non-limiting examples of certain embodiments of the present invention, in which like numerals represent like elements throughout the several views of the drawings, and wherein:

FIGS. 8A and 8B depict cross sections of exemplary rails.

FIG. 9 depicts an exemplary cross section of an external rail track.

FIG. 10 depicts an exemplary cross section of an internal rail track.

DETAILED DESCRIPTION

Exemplary embodiments described, shown, and/or disclosed herein are not intended to limit the claims, but rather, are intended to instruct one of ordinary skill in the art as to various aspects of the invention. Other embodiments can be practiced and/or implemented without departing from the scope and spirit of the claimed invention. As an example, the description below discusses panels primarily with respect to photovoltaic solar panels. Nonetheless, the term panel can mean a window, such as a skylight, a mirror, or any plane for which the cleaning system can be utilized.

Applicant hereby incorporates by reference in its entirety U.S. application Ser. No. 13/567,205, filed by Inventor Georg Eitelhuber on Aug. 6, 2012. The application was published as US 2013/0037051 A1 on Feb. 14, 2013. The language and embodiments of the application will not be repeated herein for the purpose of brevity.

Figure 1:
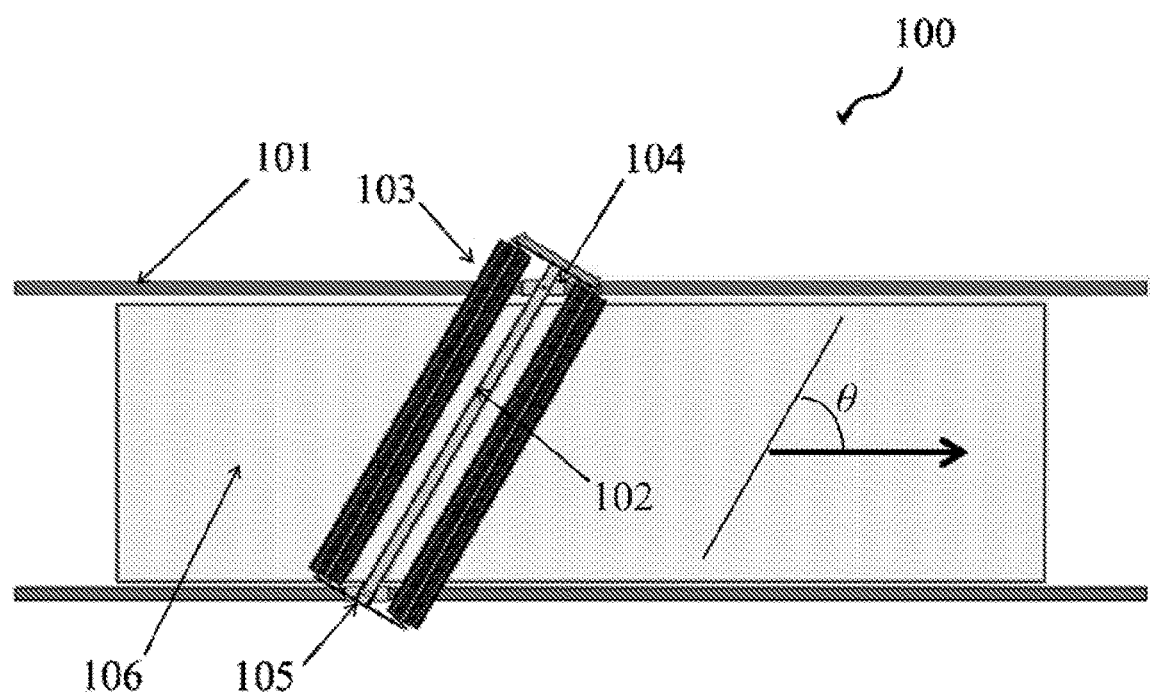
FIG. 1 depicts an exemplary system in an operational position.

An exemplary embodiment is shown schematically in FIG. 1. The track and cleaning system (100) can have a brush assembly (102) with at least one rotatable brush (103) having a rotational axis. A drive can be configured to translate the brush assembly parallel to the rail (101). A carriage assembly (104) for translating the brush assembly can have a pivot, which can be configured to allow pivoting of the rotational axis in a plane parallel to the rails and the rotational axis, which is also parallel to panel (106). The pivoting action can further be aided by a trailing assembly (105), which can have another pivot that is slidably attached to the brush assembly. Directional arrow shows the direction of travel of the brush and carriage assemblies. The angle, θ, between the direction of travel and the rotational axis of the brushes can be less than ninety degrees when the duster is operating.

Figure 2A:
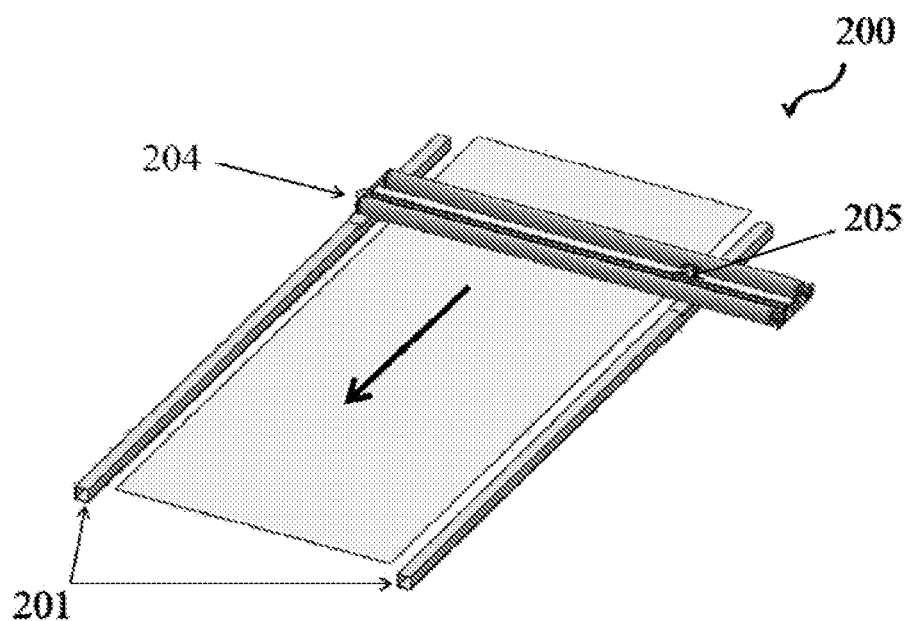
FIGS. 2A-2C depict an exemplary system in initial, intermediate, and operational configurations.
Figure 2B:
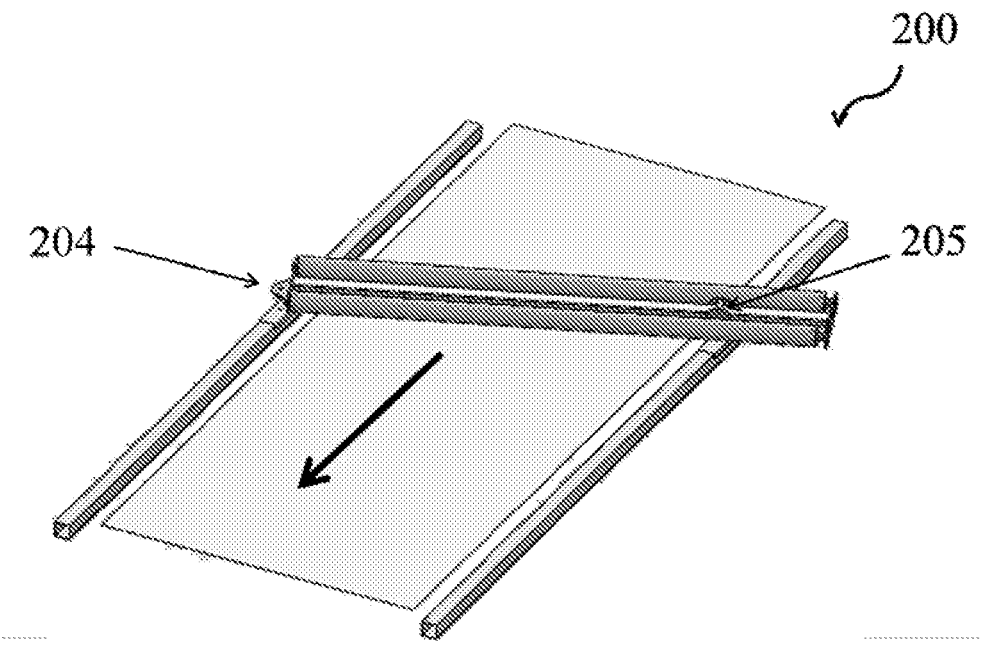
Figure 2C:
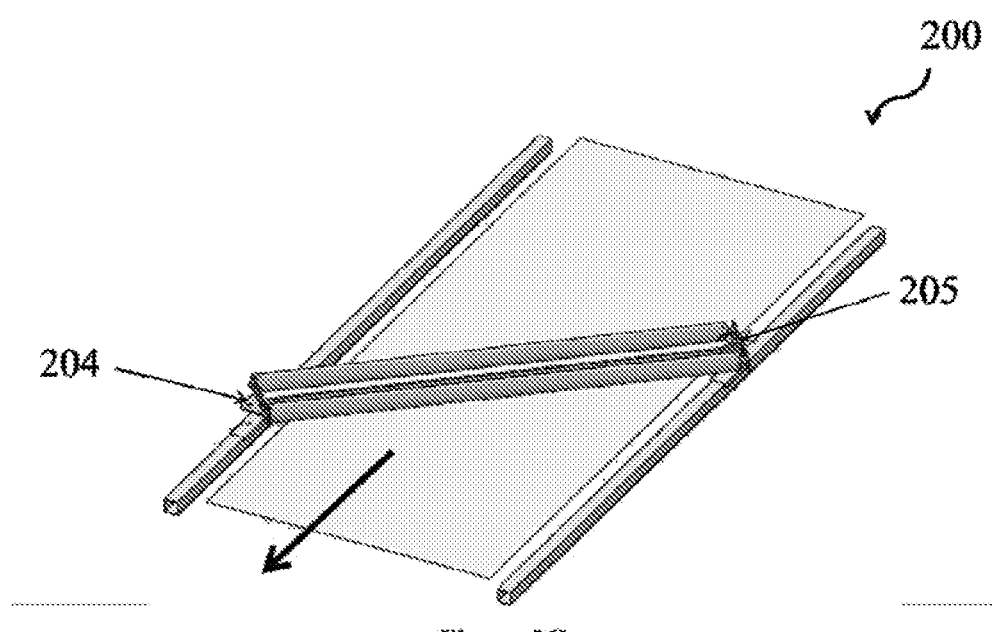

FIGS. 2A-2C show a cleaning system in an initial configuration, as well as two operational configurations. As the carriage assembly (204) is driven across the panel, the pivots in the carriage (204) and trailing (205) assemblies can allow the longitudinal axis of the brushes to rotate parallel to the panel. Initially, the brushes can overhang the trailing assembly. This distance of overhang can decrease as the brushes rotate into an operating position, as shown in FIGS. 2B and 2C.

An advantageous aspect of the system is the way the device can slide up into an angled position that can allow the top end to lead. This can allow dust and debris to fall forward and away from the brush-panel interface. The unique roller support on the bottom of the brush assembly can allow the system to be supported by a cart, always directly over the rail.

Leading the top edge of the brush assembly can dramatically increase effectiveness of the cleaning in several ways. The dust at the top need not be re-brushed many times on the way down after being dislodged, as can happen if the brush is constrained vertically.

Further, the bristle pattern on the brushes can be straight instead of spiral. This can facilitate flicking the dust and debris from the surface, rather than grinding them across the panel surface by lateral relative velocity of a bristle spiral. Yet because of the nonperpendicular angle, with respect to the direction of travel, dust and debris can still be directed towards the bottom edge more rapidly.

In an embodiment, the solar panel cleaning system can incorporate one or more support assemblies to support the brushes. The system can also have one or more motors to operate the rotatable brushes and/or a drive wheel. The rotatable brushes can move across a panel in a direction, for example as shown by the directional arrows in FIGS. 1-4, and/or in the opposite direction. Additionally, the rotatable brushes can pivot to a certain degree across the surface.

When in a run position, i.e. an operational position, the angle θ between the direction of travel, defined by the direction of the track, and the rotational axis, defined by the longitudinal axis of one or more of the brushes, can be between zero and 180 degrees. When the brushes are in rest position, the rotational axis can be perpendicular to the rails. Further, the rotatable brushes can be rotated counter-clockwise and/or clockwise from a rest position to reach an operating position.

The embodiment of FIG. 2C shows an operating configuration where the angle has been defined by the length of the brush assembly. Once the sliding member reaches the end of the brush assembly, the trailing assembly can be pulled by the driven carriage assembly at a defined angle. The embodiment of FIG. 2B shows an operating configuration in which the brush assembly is allowed to pivot until an equilibrium angle is achieved. The mechanical advantages in the embodiments are manifold. For example, the tracks can have very large tolerances for lateral distance apart, and the brush can simply find its own angle comfortably. For straight brushes, conversely, such changes in the lateral angle would result in the system pulling itself apart. Exemplary operating angles can include 30 to 80 degrees, 40 to 75 degrees, 50 to 70 degrees, 55 to 65 degrees, and/or less than 60 degrees.

Figure 3A:
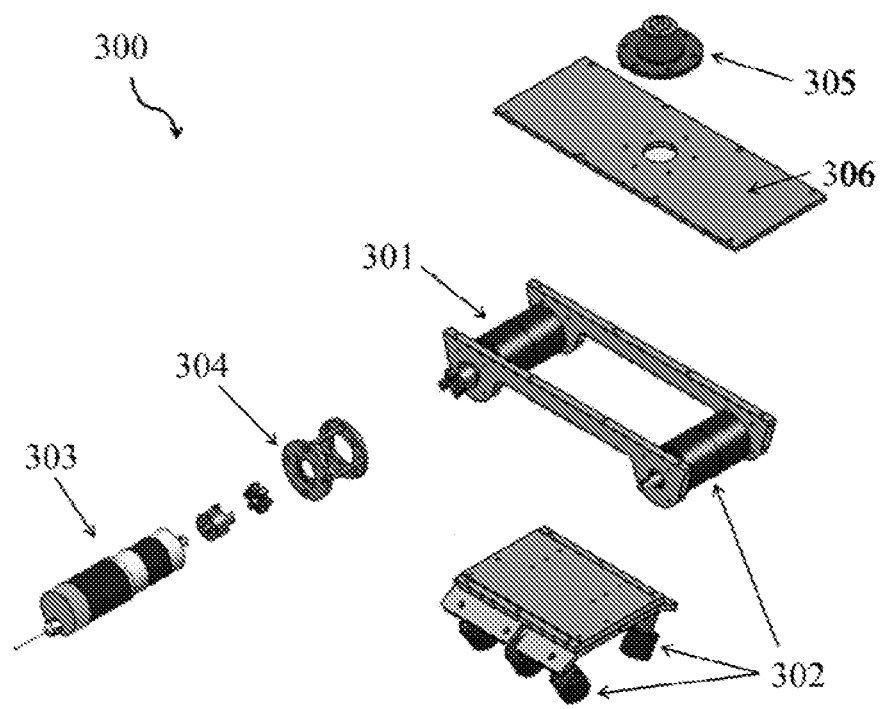
FIGS. 3A and 3B depict an exemplary carriage assembly.
Figure 3B:
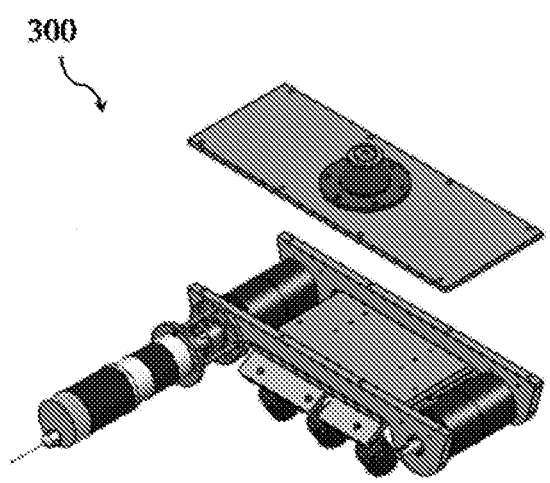

FIGS. 3A and 3B are an exploded view and a substantially assembled depiction of the carriage assembly (300). The carriage can have one or more drive wheels. In the exemplary embodiment of FIG. 3, drive wheel (301) can be attached to motor (303) by means of a coupling (304). Rollers (302) can form a triangular shape when assembled so as to hold tight to a rail with a triangular cross section. The term roller herein can mean wheel, caster, bearing, roller bearing, and/or other elements. The carriage can further have a pivot (305) mounted to a pivot plate (306) or be otherwise mounted.

Figure 4:
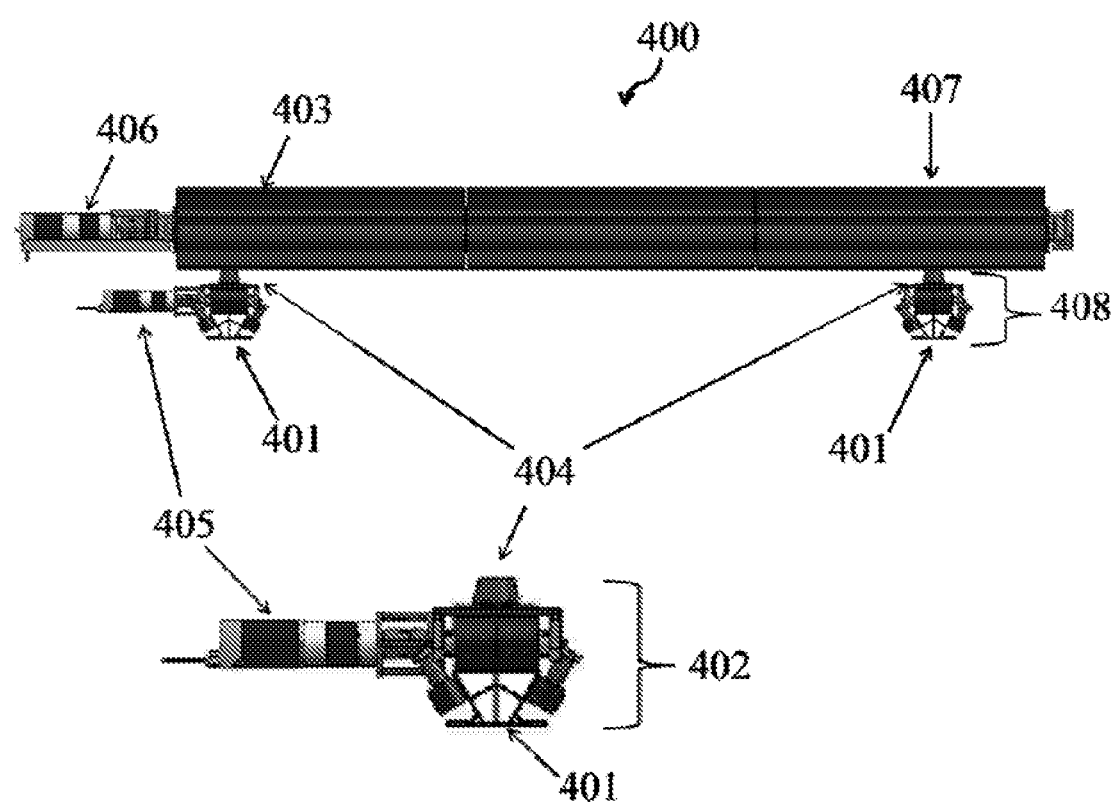
FIG. 4 depicts an exemplary track and cleaning system.

The triangular shape of the rollers is shown in the exemplary cleaning system (400) of FIG. 4. As can be seen, carriage assembly (402) can be configured to hold tight onto rails (401), which have a triangular cross section. A closer view of the cross section of the rail, including hollow areas and exemplary internal support structures, can be seen in FIG. 5.

Referring again to FIG. 4, a brush assembly can frame rotatable brushes (403) and be attached to pivots (404). The brush assembly can thereby be attached to the drive wheel, via the carriage assembly, and to the trailing assembly (408), via a slidable pivot (407). The rotatable brushes can include a shaft and a sweeping member. The sweeping member can be made of bristles comprising bristles, such as hair, plastic, and/or metal bristles. Alternatively, the sweeping member can be made of foam and/or sponge.

A brush assembly motor (406) can be used to actuate and/or rotate the rotatable brushes about their longitudinal axes. The shaft can be coupled to a drive transmission. The brushes can rotate about their axes such that the part of the brush in contact with the surface moves in the same direction as the direction of travel of the brush assembly and/or in the opposite direction. The carriage assembly can be coupled to a drive motor (405). Although not shown in FIG. 4, the trailing assembly can also be coupled to a drive motor, for example to facilitate returning the brushes to a perpendicular orientation for storing and/or to facilitate reversing the direction of travel. Alternatively, the brushes can be configured to return to a perpendicular orientation, with respect to the track, simply by continuing to rotate the brushes as the drive motor translates the brush assembly to its starting position opposite the directional arrow.

In an embodiment, there can be one motor to operate the rotatable brushes. The brushes can be configured to rotate in the same direction synchronously or in two different directions through the use of gears. Gearing can be utilized to rotate different brushes of a multi-brush assembly at different speeds. In an embodiment there may be two or more motors. In such an embodiment, several brushes can be individually operated by different motors.

Figure 5:
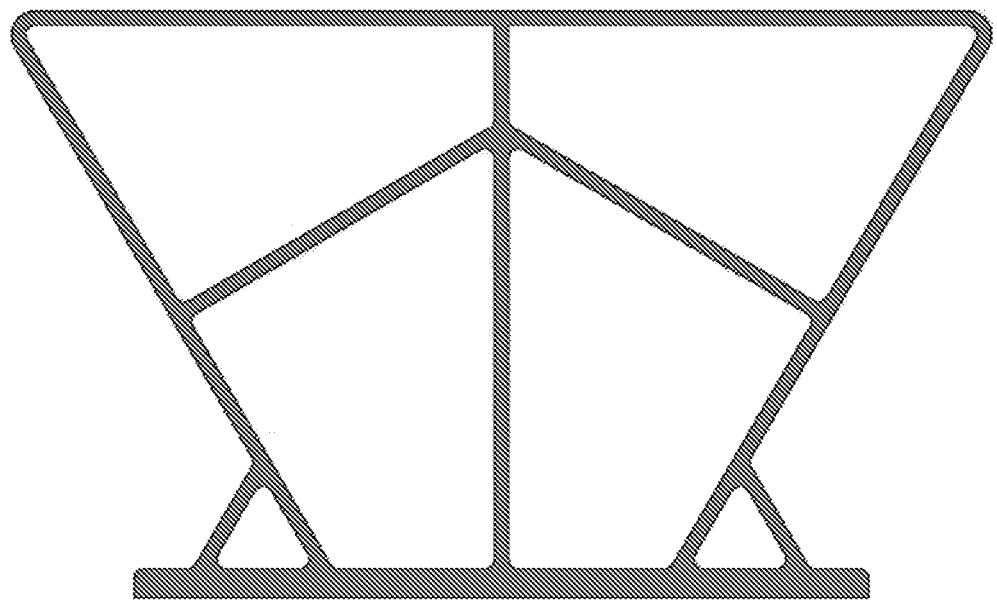
FIG. 5 depicts an exemplary cross section of a rail.

FIG. 5 shows a rail having a triangular cross section. The shape and internal support features can be achieved an extrusion process. The rail can be, for example, extruded aluminum. Such is advantageous as the rail can be very stiff and rigid. Moreover, such a rail can have a closed configuration and can have good bending moment characteristics.

Figure 6A:
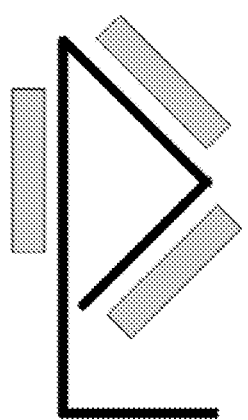
FIGS. 6A-6C depict exemplary configurations of rail cross sections.
Figure 6B:
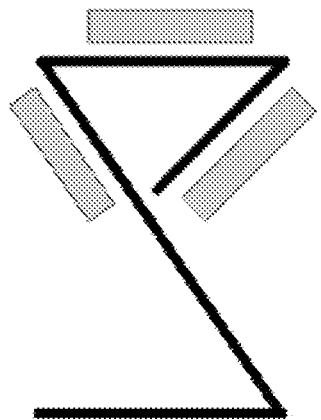
Figure 6C:
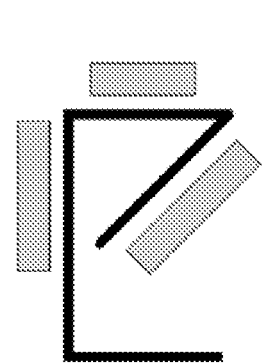

FIGS. 6A-6C show alternative rail configurations that can be advantageously fabricated from cold rolling processes. Such materials as cold rolled steel provide many benefits. The rails can be long, without seams, and very strong. Cold rolled rails can be very stiff, and ordinary cold rolled steel can be utilized inexpensively. Moreover, cold rolled metal can further act as a load bearing member to provide structural support, for example, to an entire photovoltaic array. The grey rectangles in FIGS. 6A-6C represent roller positions around the rail. An advantage to the triangular cross sections in FIGS. 5 and 6 is that the number of rollers for maintaining the carriage and/or trailing assemblies on the rails is minimized.

Figure 7:
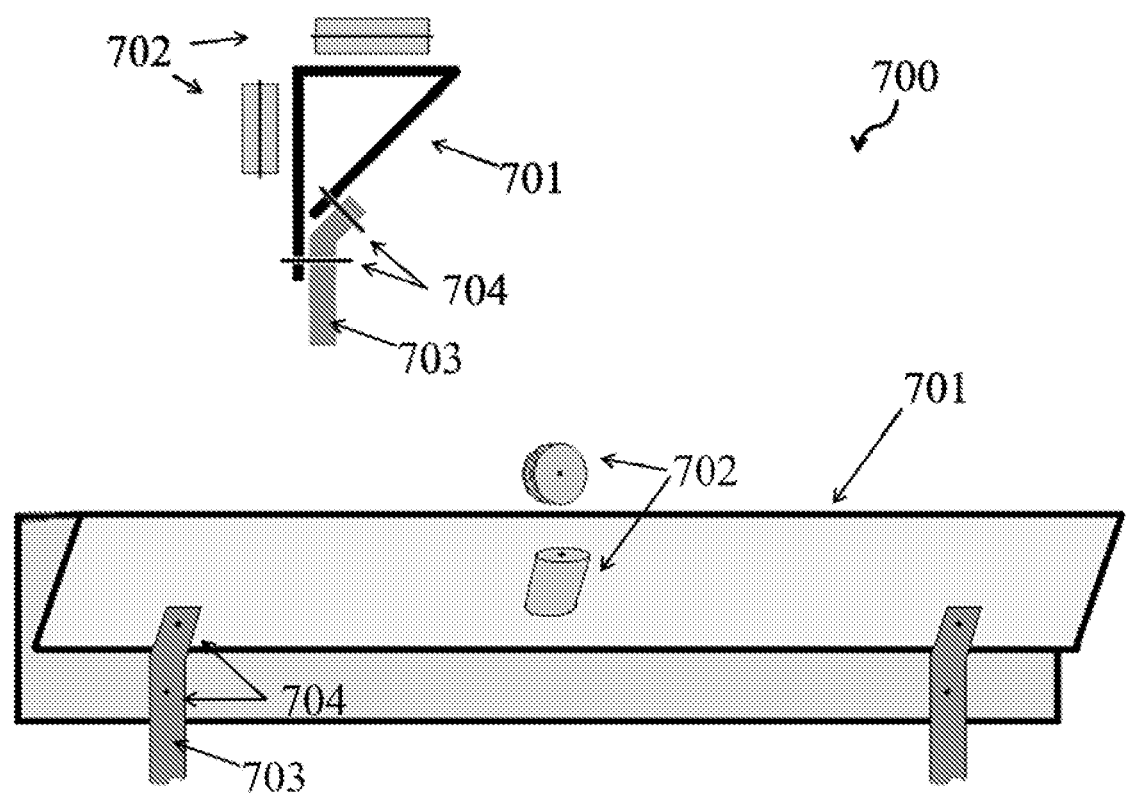
FIG. 7 depicts two views of an exemplary track.

FIG. 7 shows a track system (700) that can include a rail (701). Rollers (702) can be utilized on all three of the planar faces of the rail. The rail can include intermittent supports (703) and fasteners (704), such as bolts and/or rivets. The intermittent supports can be, though need not be, attached to a solar panel support or to a solar panel directly. If made for the track alone, and not a load bearing member, intermittent supports can be used to attach the track to the main support. The supports can provide additional stiffness to the cross section of the rail by joining the two parts of the rail intermittently.

Although an advantage of the present system is in the minimization of the number of rollers and/or roller assemblies required, it may be advantageous and/or convenient to use rollers on four or five faces of a track. FIGS. 8A and 8B shows contemplated rail configurations, as well as various roller positions.

Two alternative embodiments are shown in FIGS. 9 and 10. FIG. 9 shows an external rail configuration with a triangular cross section. A drive wheel is represented by the large rectangle on top and two sets of complimentary rollers are represented by the rectangles on either side of the rail. In FIG. 10, the rollers are internal to the rail. An internal rail can be beneficial is it can be more compact than an external rail. Moreover, as will be shown, an internal rail can allow a brush system to be disposed close to the plane of a surface by mounting the rail such that the top of the channel is flush with the surface to be swept.

Figure 11:
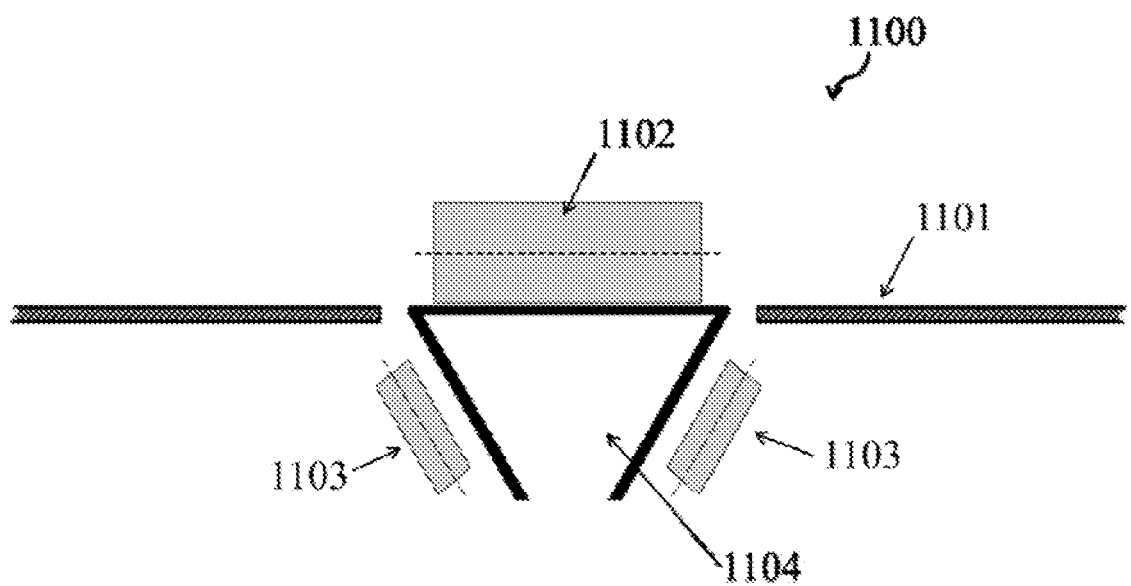
FIG. 11 depicts an exemplary embodiment of a photovoltaic array system.
Figure 12:
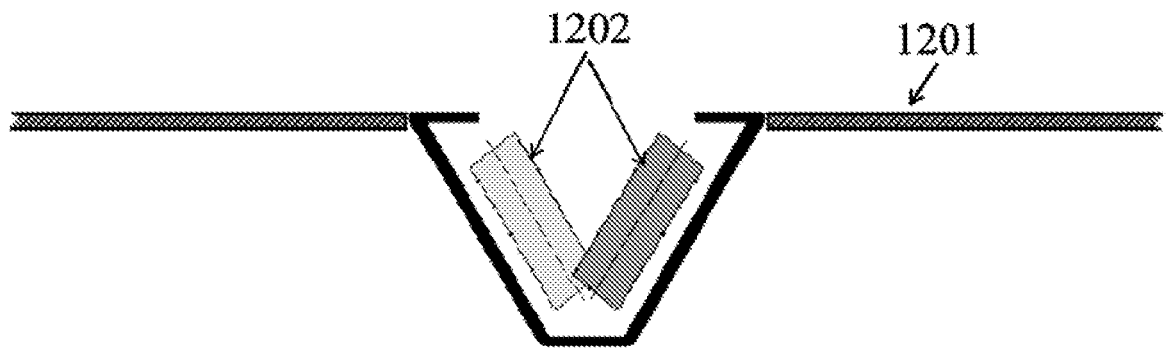
FIG. 12 depicts an exemplary embodiment of a photovoltaic array system.

FIGS. 11 and 12 show two configurations for positioning a solar panel cleaning system (1100) close to the surface to be cleaned, for example a solar panel surface (1101). A primary roller (1102), i.e. a load-bearing drive wheel, is positioned on top of a triangular rail (1104). The top surface of the rail has been disposed in the plane of the solar panel surface. Complementary rollers (1103) are shown on either side of the triangular rail. In FIG. 12, the rollers can be more compactly configured within the channel of the rail, dramatically reducing the profile of the cleaning system. Further, the configuration can allow the rail and cleaning system to be disposed very close the surface to be cleaned. It can be advantageous to include means for dust abatement, such as a flexible hood or bristles along the top of the channel and/or egress apertures along the bottom of the channel. Additionally, a skirt around the pivot and sliding members can be utilized to prevent dust and debris from falling into the channel. Further, the assembly components can be disposed in a housing to seal them from dust and dirt.

The system can further include a self-cleaning system configured to automatically clean the one or more rotatable brushes. The system can be integrated with a housing for the brushes or merely attached to an edge of a panel array. A self-cleaning member can include a stiff brush, a row of rake-like tines, a bar, or other effective elements against which the rotating brushes can pass while rotating and thereby eliminate excess dust and debris buildup.

Figure 13:
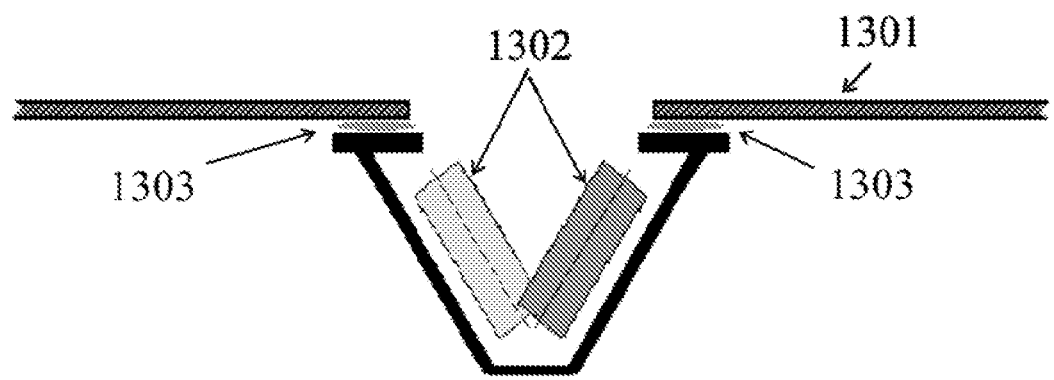
FIG. 13 depicts an exemplary embodiment of a photovoltaic array system.
Figure 14:
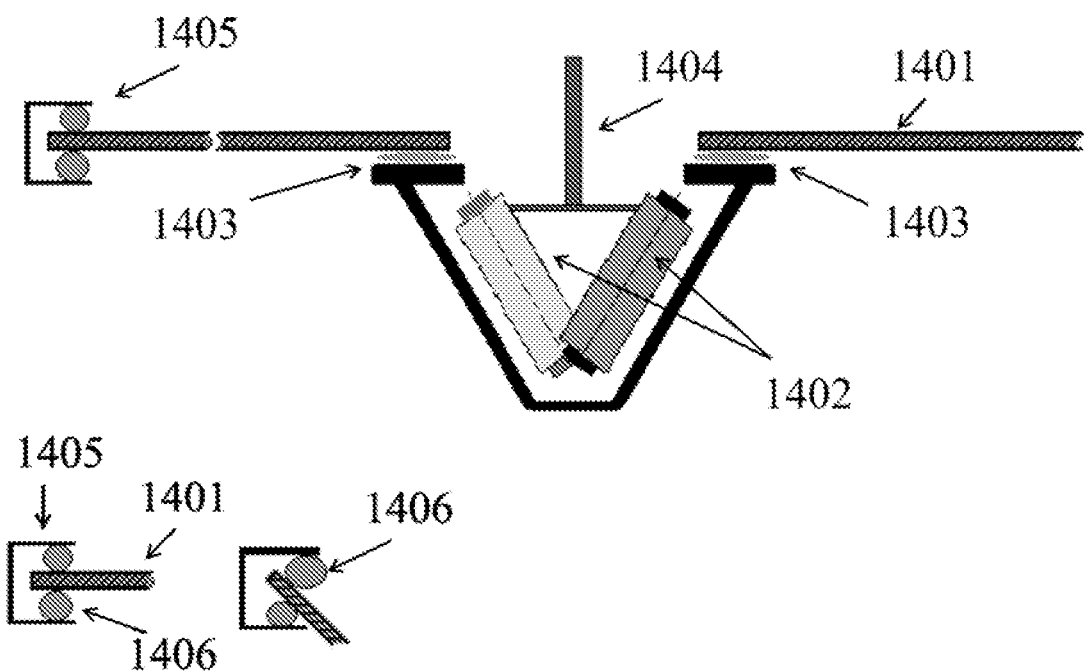
FIG. 14 depicts an exemplary implementation of a photovoltaic array system.

In FIG. 13, similar to FIG. 12, the rollers (1302) can be disposed within a channel. The internal rail can be adhered to the solar panels (1301), for example with resin (1303). FIG. 14 additionally shows a pivot arm (1404) for attaching to a brush assembly. Rubber strips (1406) with circular cross sections can be attached inside support frame members (1405) having a C-shaped cross section. The members can be used to mount the solar panels (1401). The support frame can be bolted to a main array. The support frame can be part of the main array, for example as an integral part of an extrusion. As shown in FIG. 14, a panel can be inserted straight (where there is clearance), and then can be let down to an angle of tilt. This can crush the rubber strips, and can thereby cause a locking force on the panels. The other end of the panel can be held down either by a resin stick, by small clamp, and/or by an adhesive. Conversely, the rubber bits can be attached to the panels themselves for substantially the same effect.

Figure 15:
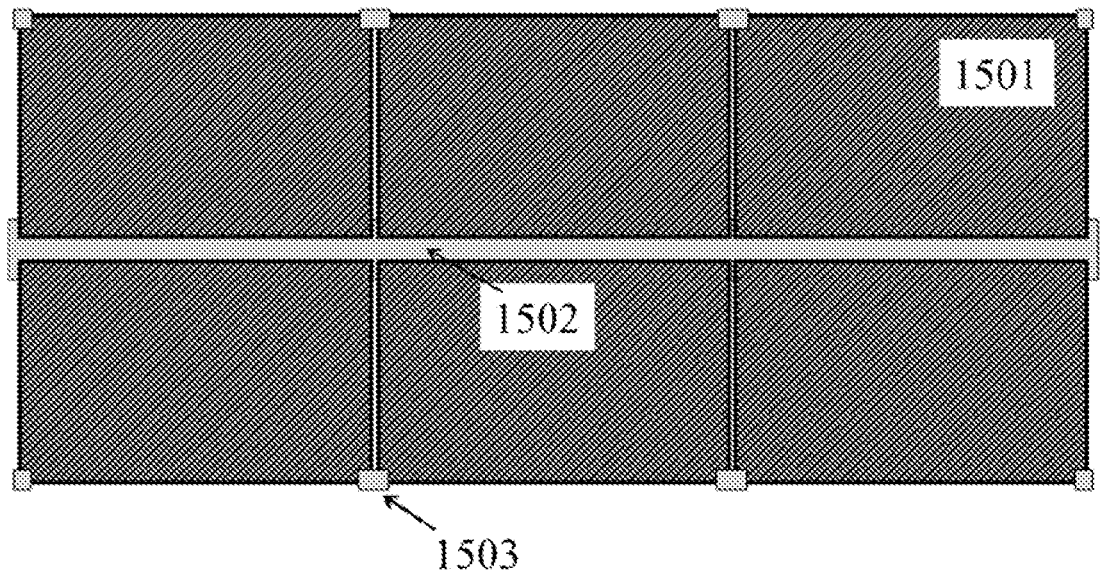
FIG. 15 depicts a photovoltaic array with a central track system.
Figure 16:
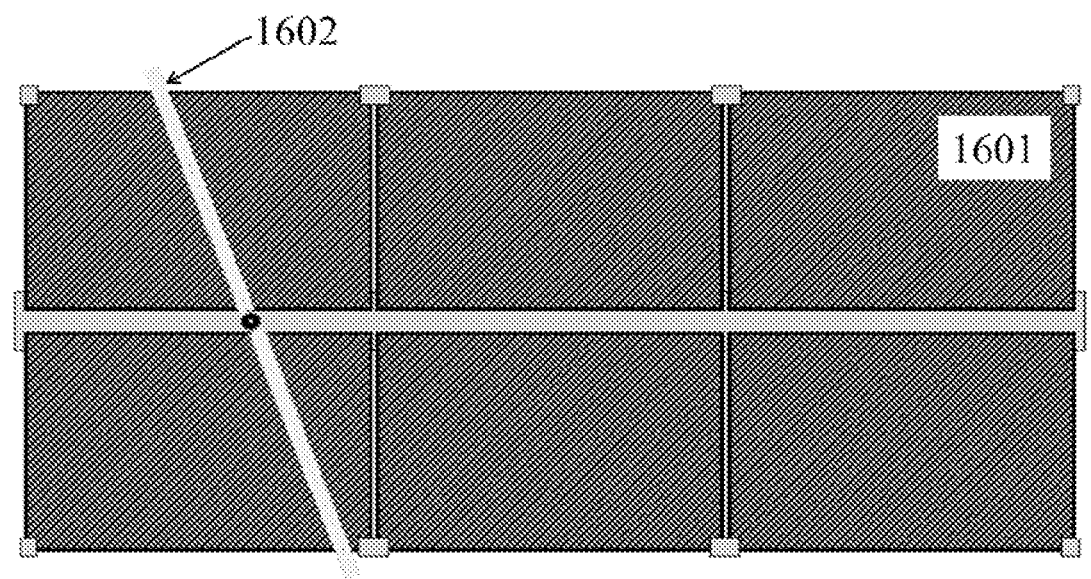
FIG. 16 depicts a photovoltaic array during operation of the system.

FIGS. 15-19 show various embodiments of a photovoltaic array. In FIG. 15, solar panels (1501) can be mounted to support structures (1503) and track (1502). The track can be an internal rail, such as a channel, or an external rail. As shown in FIG. 16, the cleaning system (1602) can be centrally mounted to a pivot connected to a carriage assembly which utilizes only a central track. Alternatively, trailing roller assemblies can be incorporated along the top, bottom, or top and bottom edges of the array of solar panels (1601), similar to embodiments shown in FIGS. 1-4.

Figure 17:
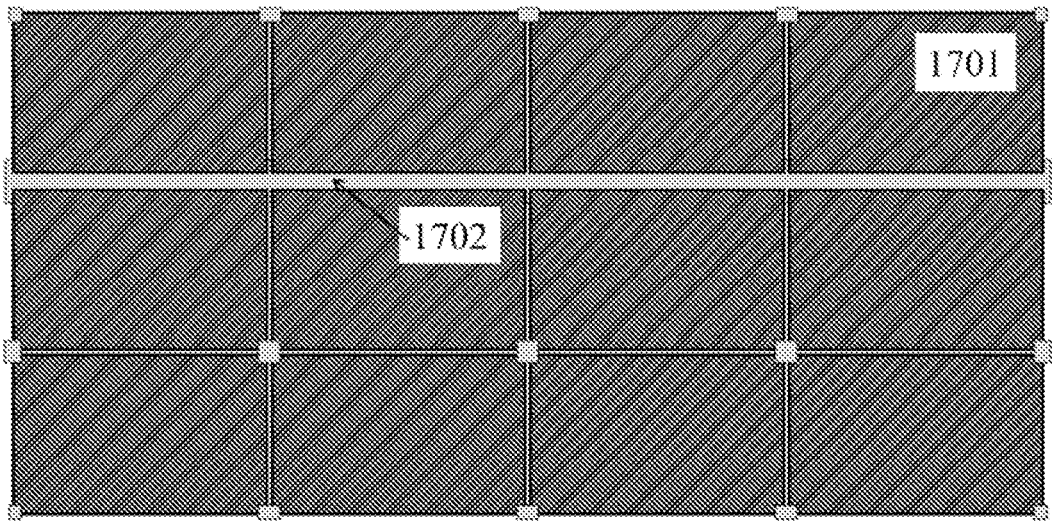
FIG. 17 depicts a photovoltaic array with an off-center track.
Figure 18:
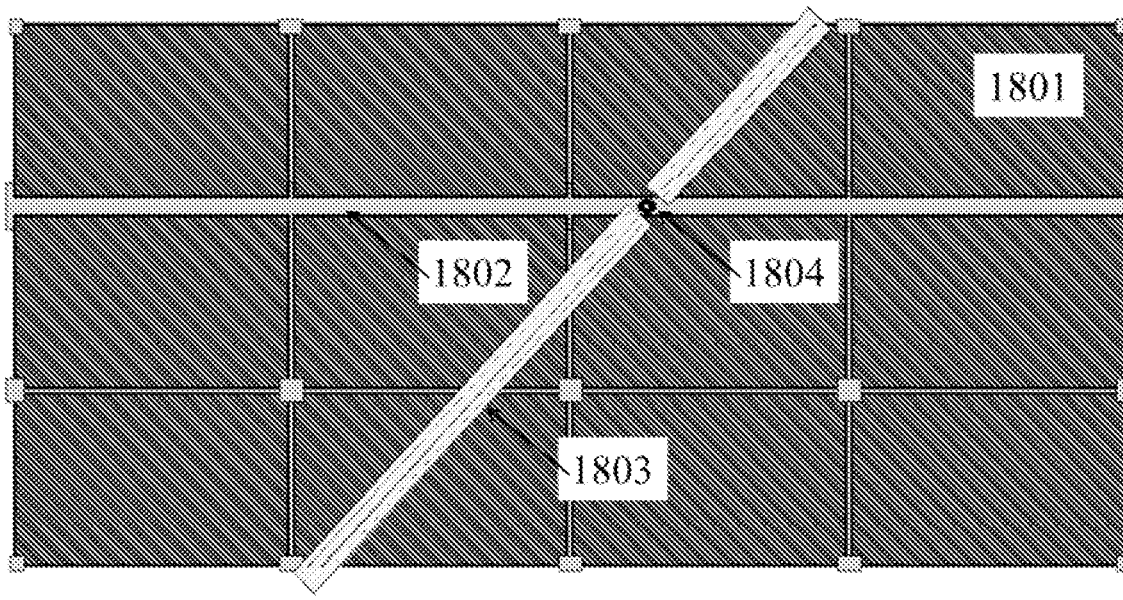
FIG. 18 depicts a photovoltaic array during operation of the system.

Referring to FIGS. 17 and 18, the array of solar panels (1701) can include a track (1702) that is off center. Here also, the track can be an internal rail, such as a channel, or an external rail. The carriage and pivot (1804) can be utilized alone or in combination with other roller assemblies to translate and pivot the cleaning system (1803).

For a centrally located track, it can be advantageous to incorporate a trailing assembly with its own drive or motor, or to incorporate a rolling resistance to facilitate pivoting. A motor can be integrated with the pivot to produce a power-actuated pivot.

Figure 19:
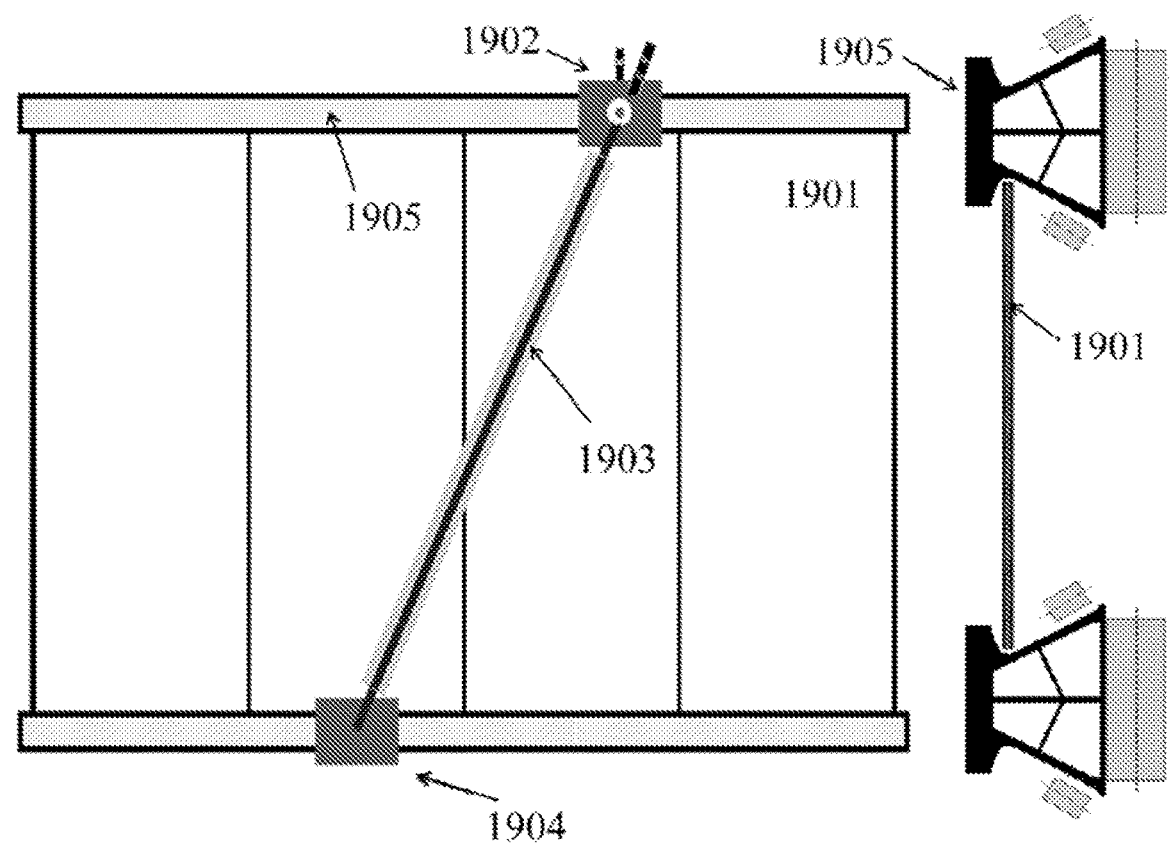
FIG. 19 depicts an overhead view and a cross sectional view of a photovoltaic array during operation of the system.

In FIG. 19, solar panels (1901) can be supported by and mounted to rails (1905). Brush assembly (1903) can be translated and operated by carriage assembly (1902). The translation, orientation, and support of the brush can further be facilitated by a trailing roller assembly (1904). As shown above, the carriage and the trailing assembly can have substantially similar roller configurations.

The cleaning system can further include a monitoring device to determine whether a cleaning is required. The device can include a meter of the output of the solar panels. Alternatively, the device can include sensor system for measuring the efficiency and/or effectiveness of the photovoltaic elements.

The monitoring device can be in communication with a control device. The control device can be configured to activate the cleaning system. The control device can be configured to send a signal indicating the status and/or the need for cleaning a panel. Additionally, the control device can be configured to send a signal indicating a fault or error in the array system, including in the cleaning system.

Figure 20A:
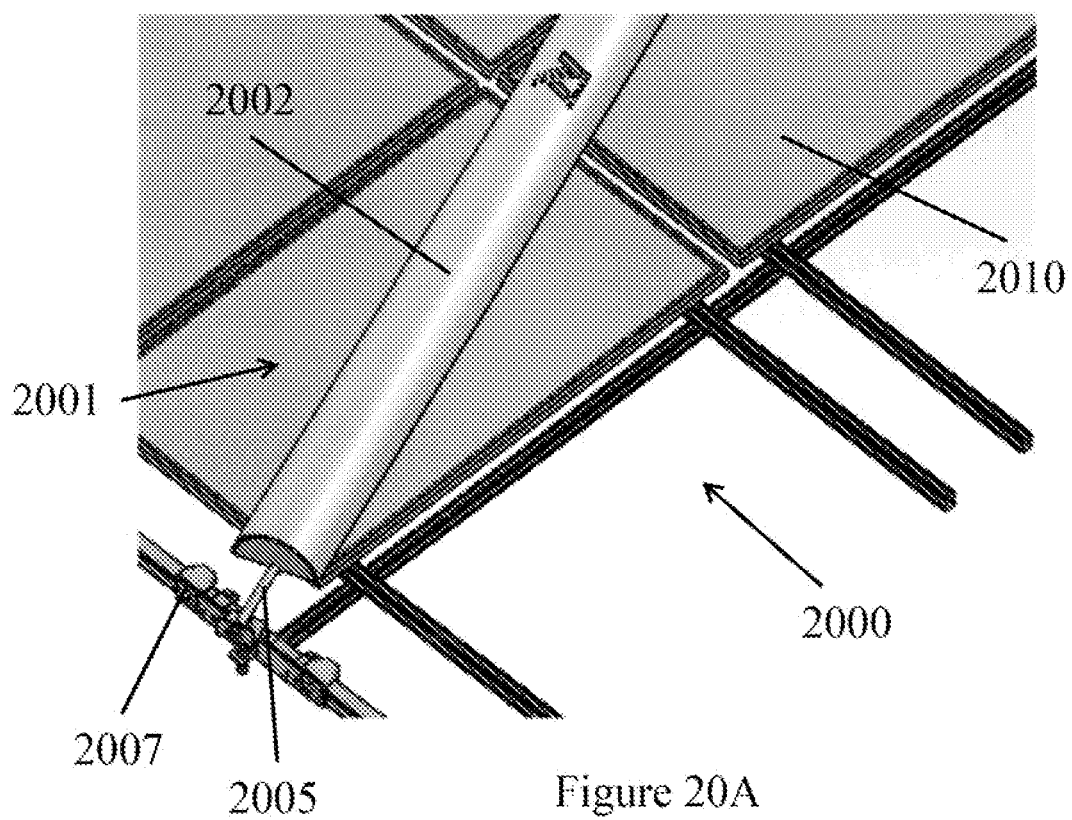
FIGS. 20A-20E depict an exemplary embodiment of a brush assembly.
Figure 20B:
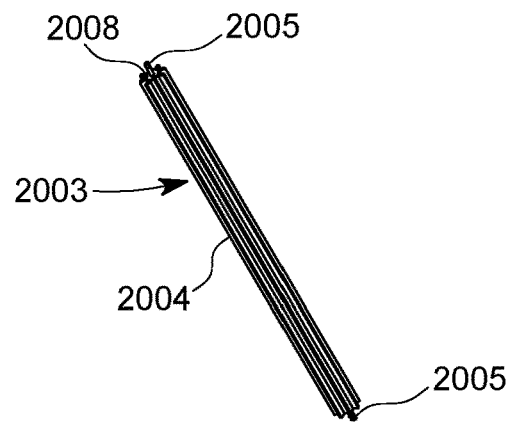
Figure 20C:
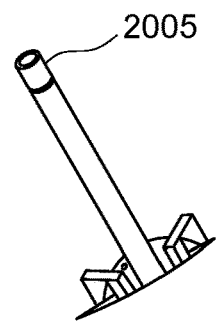

Referring to FIG. 20A, a cleaning system (2000) for cleaning solar panels (2010) is depicted. The cleaning system (2000) may include a brush assembly (2001) for cleaning the solar panels (2010). The brush assembly (2001) may include a brush (2003), as depicted in FIG. 20B. The brush (2003) may include one or more bristles (2004) extending outwardly from the core (2008). A shaft (2005), as illustrated in FIG. 20C, may extend through the core (2008) of the brush (2003). The shaft (2005) may be a telescoping shaft, which is configured to retract and expand to create an elongated brush (2003).

Figure 20D:
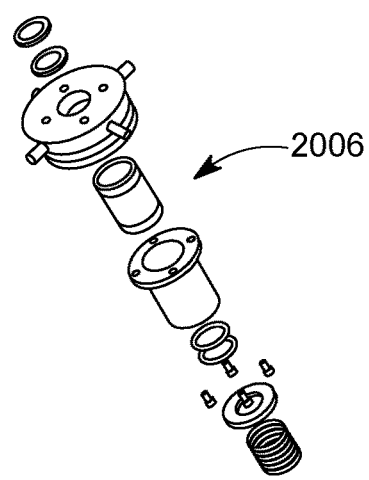
Figure 20E:
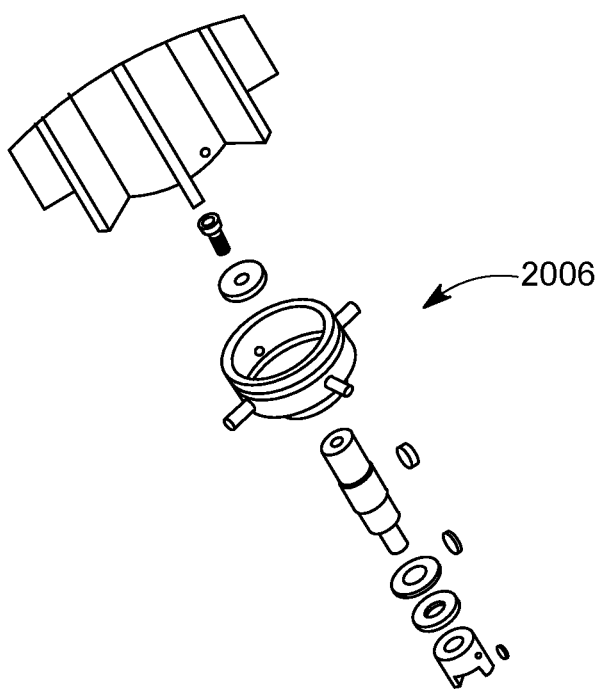

The shaft (2005) may be connected to a slider-bearing hub assembly (2006), as illustrated in FIGS. 20D and 20E, that allows the shaft (2005) to expand and retract. The slider-bearing hub assembly (2006) may include any necessary components to allow the shaft (2005) to expand and retract. For example, the slider-bearing hub assembly (2006) may include one or more washers, nuts, couplings, retainers, screws, bolts, keys, seals, bushings, etc.

Referring back to FIG. 20A, the brush assembly (2001) may include a cover (2002) that surrounds at least a portion of the brush (2003). In at least one embodiment, the cover (2002) may surround at least 180 degrees of the brush (2003). In other embodiments, the cover (2002) may surround more than 180 degrees of the brush (2003) or may surround less than 180 degrees of the brush (2003). For example, the cover (2002) may surround approximately 270 degrees or the majority of the brush (2003). The cover (2002) may be any suitable shape or material. In embodiments, the cover in generally arc-shaped.

The telescoping shaft (2005), allows the brush assembly (2001) to be attached at either end to a carriage or trailing assembly (2007), which in turn may be attached to and configured to move along a rail. The telescoping shaft (2005) may be configured to expand and retract as the angle or the direction of movement of the brush assembly (2001) changes. Alternatively, the telescoping shaft (2005) may be configured to expand and retract to extend between different rail widths, while the angle of the brush assembly (2001) remains constant.

Figure 21A:
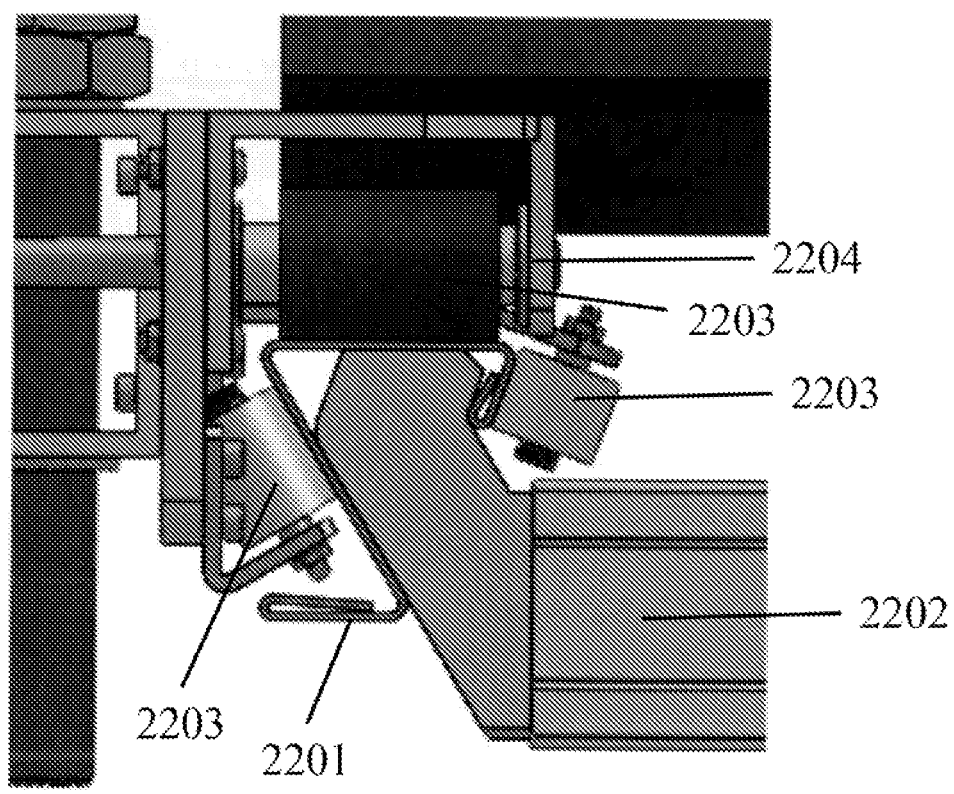
FIGS. 21A-21E depict an exemplary embodiment of a rail.
Figures 21B, 21C, 21D:
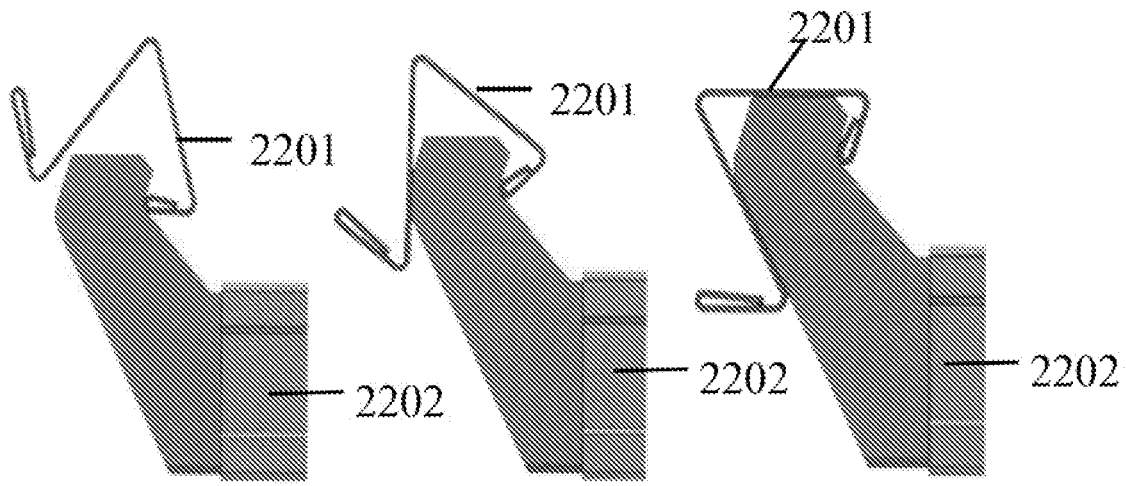
Figure 21E:
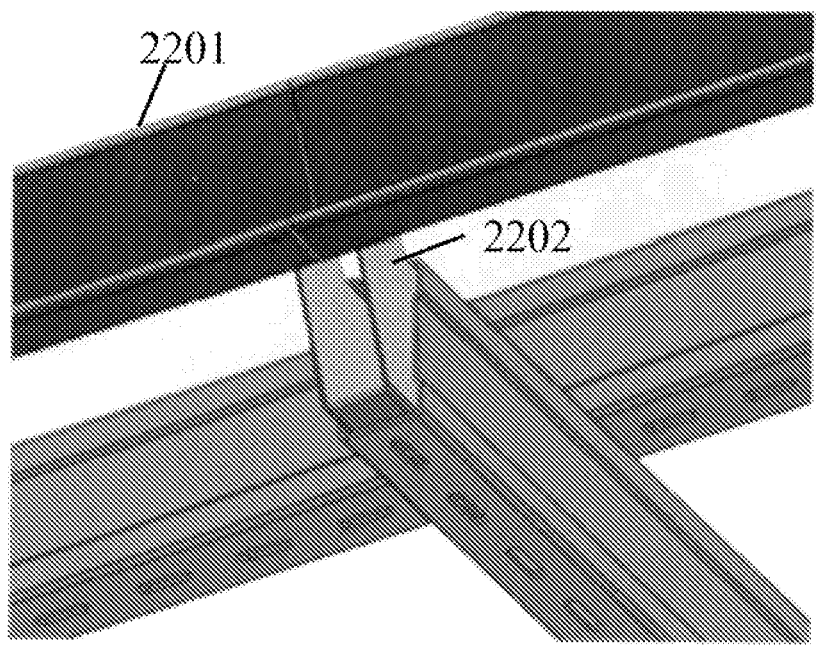

Referring to FIG. 21A, triangular rail (2201) having a generally triangular shape and an open cross-section is depicted. The triangular rail (2201) may snap on to a bracket (2202), as shown in FIGS. 20B-20D. The triangular rail (2201) may eliminate the need for fasteners to hold the rail (2201) to the bracket (2202). The shape of the triangular rail (2201) may have an advantage of simplifying the design and reducing the manufacturing cost of a track and cleaning system for solar panels. A carriage or trailing assembly (2204) may be attached to the rail (2201). The carriage or trailing assembly (2204) may include a plurality of rollers or roller sets (2203). In embodiments, the carriage or trailing assembly (2204) includes three rollers (2203), a first roller (2203) may contact a first side of the triangular rail (2201), a second roller (2203) may contact a second or top side of the triangular rail (2201), and a third roller (2203) may contact a third side of the triangular rail (2201).

The first, second, and third side of the triangular rail (2201) may be positioned at any angle. For example, the first and third sides of the triangular rail (2201) may be at an angle, and the second side may be in a horizontal plane. In at least one embodiment, the first, second, and third sides of the triangular rail (2201) are arranged to form two acute angles, such the first and third sides extend toward each other. Each side of the triangular rail (2201) may be planar surfaces. One or more rollers (2203) may be configured to hold the assembly (2204) in place. For example, the first and third rollers (2203) may hold the assembly (2204) on the rail (2201), while the second roller (2203) may be a drive roller that is configured to translate the assembly (2204) along the rail (2201). The open cross-section of the triangular rail (2201) may allow the bracket (2202) to fit within the rail (2201). For example, a top portion of the bracket (2202) may be configured to contact a bottom surface of the second side of the rail (2201), while the first and third sides of the rail (2201) are each configured to contact a side portion of the bracket (2202).

The rail (2201) may be made of any suitable material, including cold rolled steel and aluminum extrusion. In embodiments, the rail (2201) may be placed at any angle. For example, the rail (2201) can be positioned such that one side of the triangle is in a horizontal plane. Alternatively, the rail (2201) can be inverted or at any angle. The bracket (2202) may be any suitable shape. In at least one embodiment, the end of the bracket (2202) is U-shaped.

Figure 22A:
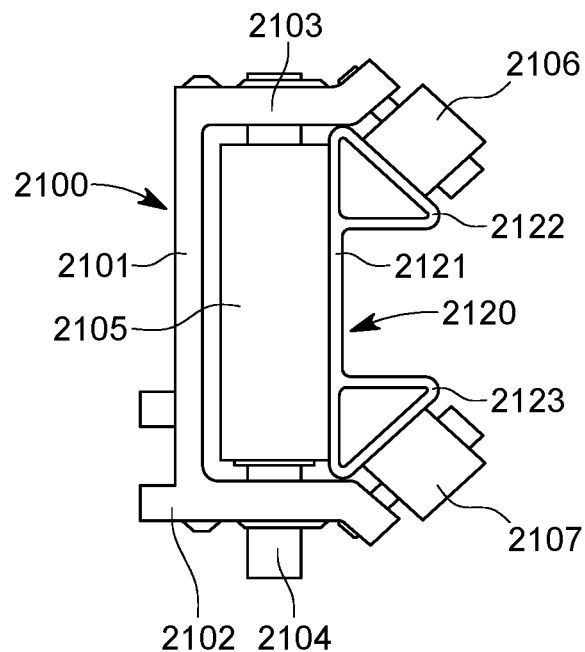
FIGS. 22A and 22B depict exemplary configurations of a carriage assembly and rail.
Figure 22B:
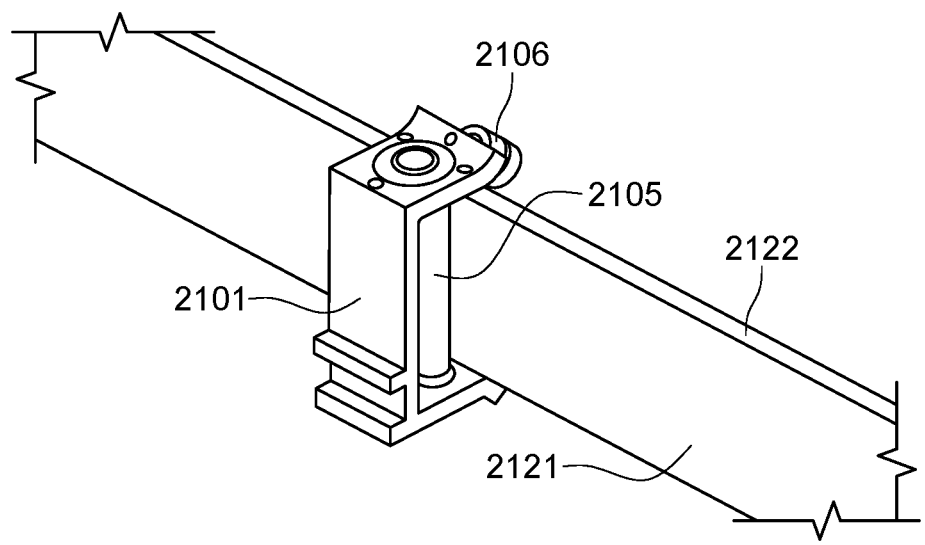

Referring to FIG. 22A, a carriage assembly (2100) and a rail (2120) are shown. The rail (2120) may be any suitable shape or size. In embodiments, the rail (2120) includes a first side (2121), a second side (2122) and a third side (2123). The second side (2122) and third side (2123) may extend from the first side (2121), each at an angle. In embodiments, the first side (2121), second side (2122), and third side (2123) form two acute angles. The acute angles may be any suitable angle less than 90 degrees. In embodiments, the second side (2122) and third side (2123) each form a generally triangular shape at one end of the first side (2121). Alternatively, the rail (2120) may be generally U-shaped.

The carriage assembly (2100) may include a bracket (2101) having a first side (2102) and a second side (2103). The bracket (2101) may include a shaft (2104) and a drive roller (2105) attached to the shaft (2104). The shaft (2104) may extend between the second side (2102) and third side (2103) of the bracket (2101) and may be parallel to the first side (2101). The shaft (2104) may extend through one or more of the second side (2102) or the third side (2103) of the bracket (2101). In embodiments, a drive motor is attached to the shaft (2104). The drive motor may be attached to the shaft (2104) in any suitable manner, including via a bracket and a coupling. The drive roller (2105) may be configured to move the carriage assembly (2100) across a surface, such as the first surface (2121) of the rail (2120).

The carriage assembly (2101) may include a plurality of rollers (2106, 2107). The rollers (2106, 2107) may be attached to the second end (2102) and third end (2103) of the bracket (2101). The rollers (2106, 2107) may be attached to the bracket (2101) by any suitable means. The rollers (2106, 2107) may be configured to keep the carriage assembly (2100) to the rail (2120).

The carriage assembly (2100) may be attached to a rail (2120) that is positioned in any direction. For example, the rail (2120) may be horizontal, vertical, or at any angle. In at least one embodiment, the rail (2120) can be an edge of one or more solar panels. Alternatively, the rail can be a support member for a row of solar panels. The carriage assembly can be made of any suitable material, such as an extrusion or cold-rolled array structure.

Figure 23:
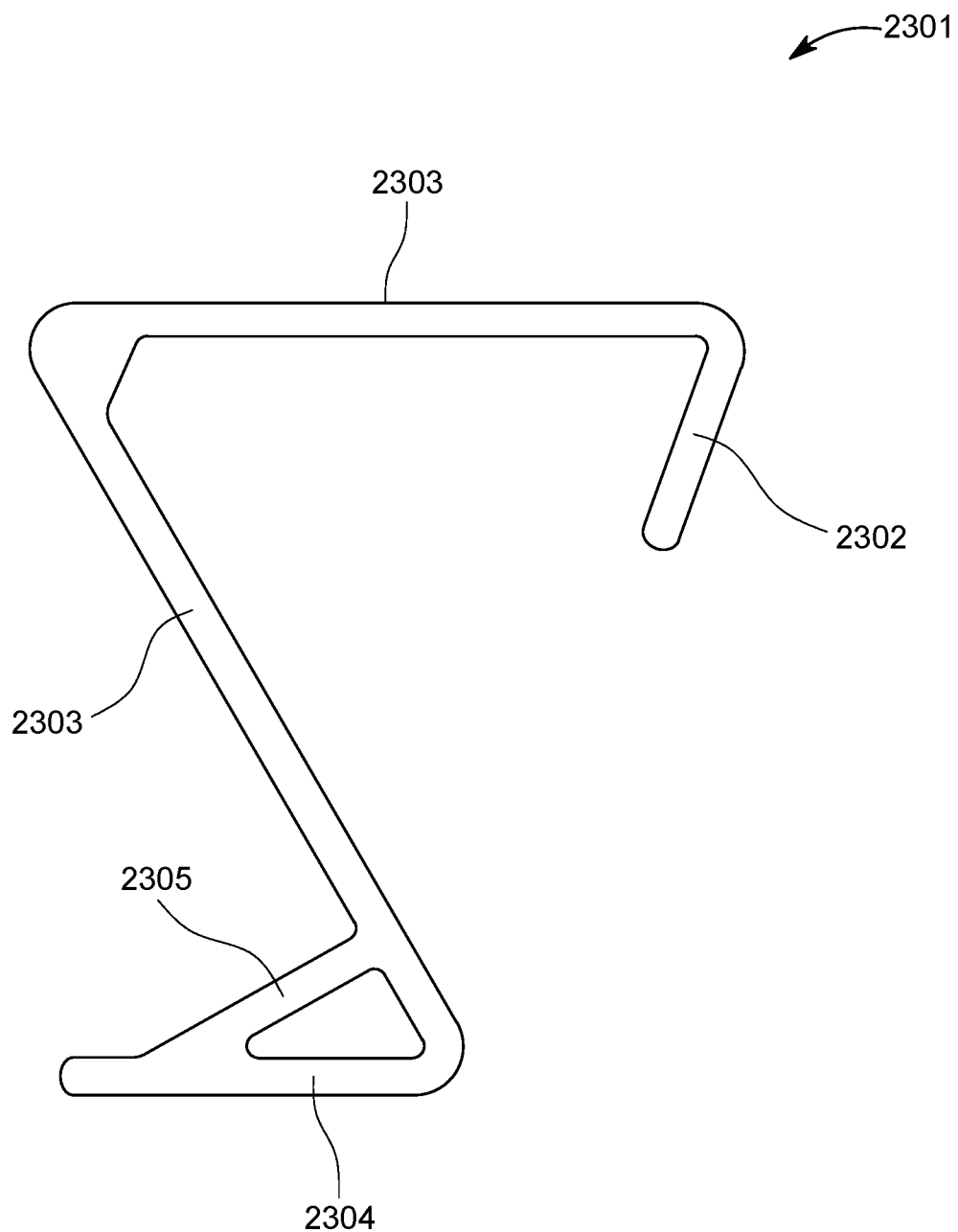
FIG. 23 depicts a cross section of an exemplary rail.

Referring to FIG. 23, the rail (2301) may have a generally triangular shape and an open cross-section. The rail (2301) may be formed from a plurality of sides. For example, the rail (2301) may be formed from a first side (2302), a second side (2303), and a third side (2304). The first side (2302), second side (2303), and third side (2304) may form a generally triangular shape having an open cross-section and may define two acute angles. For example, an acute angle may be formed between the first side (2302) and the second side (2303). The acute angle may be any suitable angle. For example, the acute angle may range between 30 and 85 degrees. In at least one embodiment, the acute angle formed between the first side (2302) and the second side (2303) is approximately 70 degrees.

An acute angle may be formed between the second side (2303) and the third side (2304). The acute angle may be any suitable angle. For example, the acute angle may range between 30 and 85 degrees. In at least one embodiment, the acute angle formed between the second side (2303) and the third side (2304) is approximately 60 degrees. The rail (2301) may also include a bottom member (2305) and an angled member (2306). The bottom member (2305) may be attached to the third side (2304). The bottom member (2305) may be parallel to the second side (2303). The angled member (2306) may be attached to the bottom member (2305) and the third side (2303), such that the third side (2303), bottom member (2305) and angled member (2306) form a triangle. The angled member may be positioned at any suitable angle. For example, approximately a 30 degree angle may be formed by the angled member (2306) and the bottom member (2305). Alternatively, the angle may be greater or less than 30 degrees.

The first side (2302), second side (2303), third side (2304), bottom member (2305), and angled member (2306) may all be planar surfaces. The rail (2301) may be made from any suitable material such as cold rolled steel or aluminum extrusion. The first side (2302), second side (2303), third side (2304), bottom member (2005), and angled member (2306) may have any suitable dimensions, including the dimensions depicted in FIG. 23.

Figure 24A:
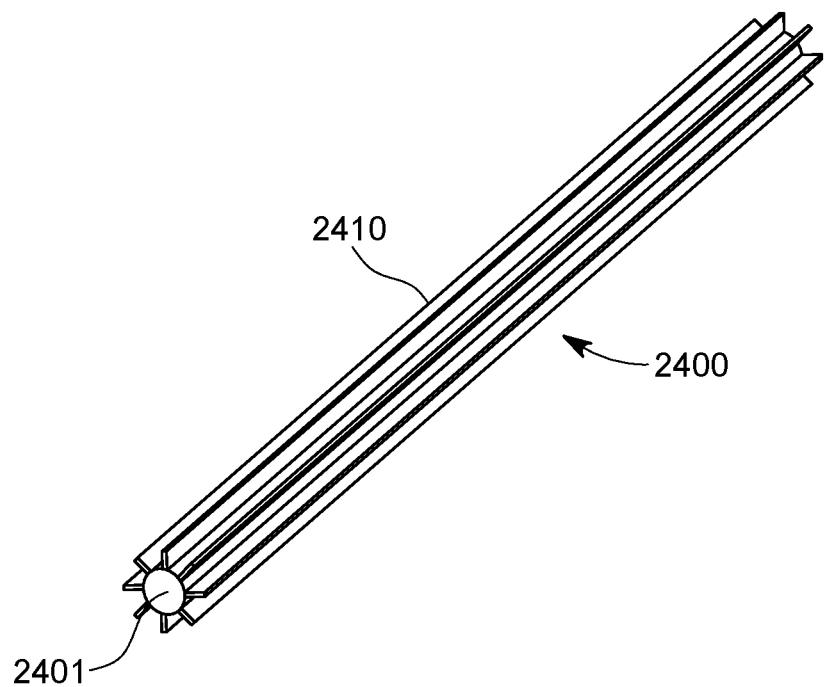
FIGS. 24A-24D depict an exemplary embodiment of a rotatable brush.
Figure 24B:
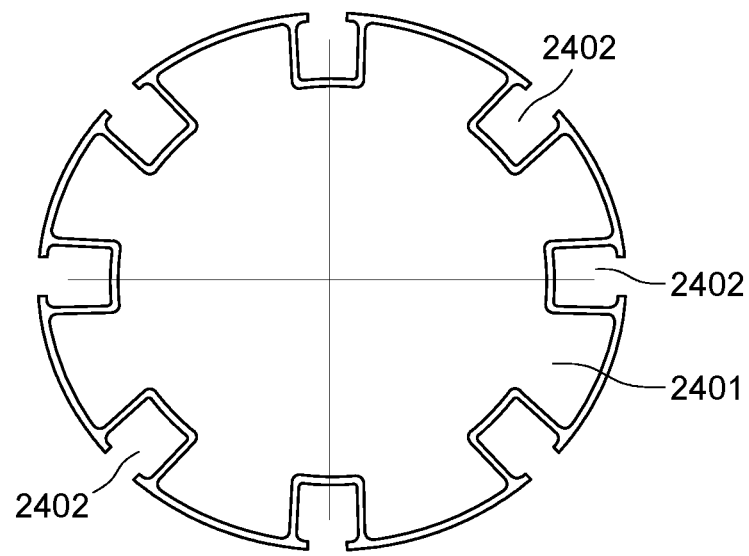
Figure 24C:
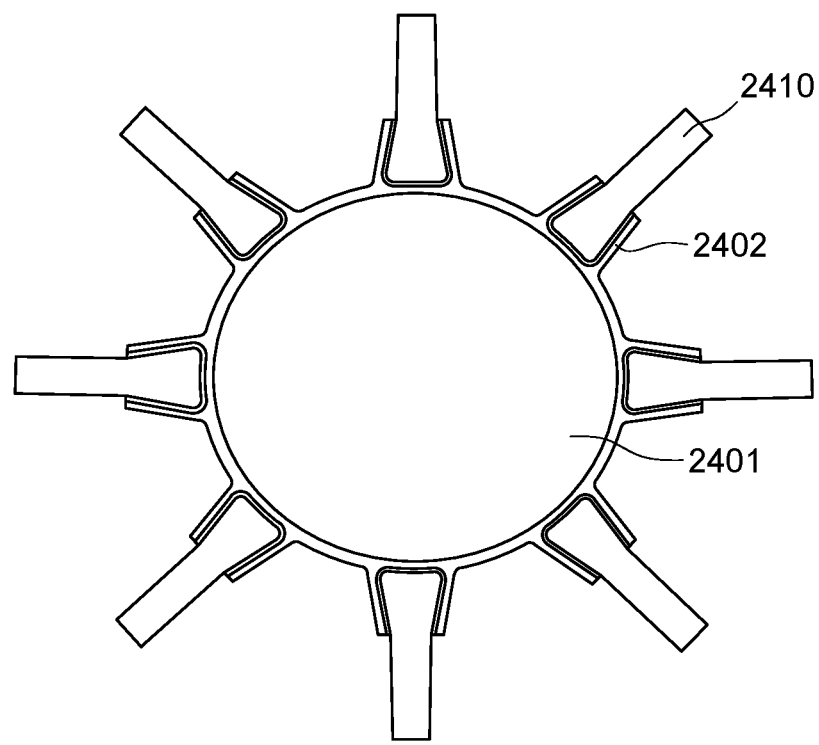
Figure 24D:
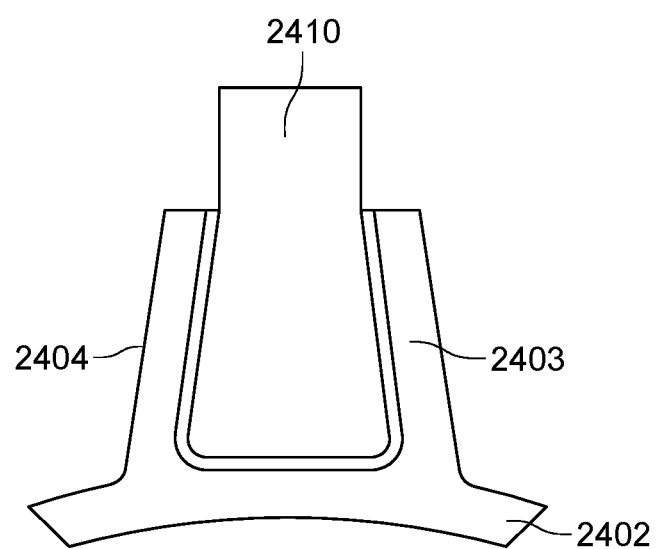

Referring to FIG. 24A, a rotatable brush (2400) in accordance with aspects of this invention is shown. The rotatable brush (2400) may include a core (2401), as shown in FIG. 24B, and bristles (2410) as shown in FIG. 24C. Referring back to FIG. 2B, the core (2401) may include a plurality of sockets (2402) for receiving the bristles (2410). Any number of sockets (2402) may be included on the core (2401). Each of the sockets (2402) may receive any number of bristles (2410). For example, each socket (2402) may receive a single bristle (2410) or a plurality of bristles (2410). In at least one embodiment, each socket (2402) is configured to receive a bristle assembly, which comprises a plurality of bristles (2410) joined together. The core (2402) may be made from any suitable material. In at least one embodiment, the core (2401) is made from a single aluminum extrusion.

The sockets (2402) may extend into the core (2401), as illustrated in FIG. 24B. Alternatively, the sockets (2402) may extend outwardly from the core (2401), as illustrated in FIGS. 20C and 20D. The sockets may include a first socket side (2403) and second socket side (2404), which are configured to hold the bristles (2410) in the socket (2402). The first socket side (2403) and the second socket side (2004) may be angled toward each other to hold the bristles (2410) between them. In at least one embodiment, the bristles (2410) may be removably attached to the sockets (2402), such that they can be replaced.

Figure 25A:
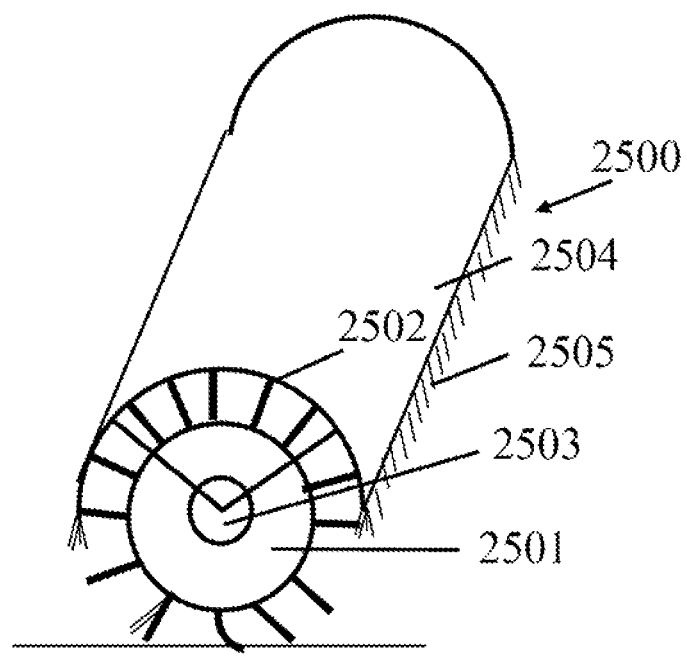
FIGS. 25A and 25B depict an exemplary embodiment of a brush assembly.

Referring to FIG. 25A, a rotatable brush assembly (2500) in accordance with aspects of this invention is shown. The rotatable brush assembly (2500) may include a core (2501) and bristles (2502) extending outwardly from the core (2501). The bristles (2502) may surround the core (2501), such that there is spacing between each of the bristles, or may be arranged in clusters or sets, having a plurality of clusters or sets of bristles (2502) around the core (2501). The rotatable brush assembly (2500) may include a rotatable axis (2503) and a cover (2504). The cover (2504) may be configured to extend over at least a portion of the brush assembly (2500). In at least one embodiment, the cover (2500) is configured to surround approximately 180 degrees of the brush assembly (2500). Alternatively, the cover (2500) may be configured to surround less than 180 degrees of the brush assembly (2500) or more than 180 degrees of the brush assembly (2500). The cover (2504) may be any suitable shape or material. For example, the cover (2504) may be generally arc-shaped. The cover (2504) may be any suitable spacing from the bristles (2502). For example, the cover (2504) may be spaced from the brush assembly (2500) such that the ends of the bristles (2502) just touch an inner surface of the cover (2504). The cover (2504) may include a plurality of static bristles (2505). The plurality of static bristles (2505) may extend from the edges of the cover (2504) and be configured to contact the surface being cleaned.

Figure 25B:
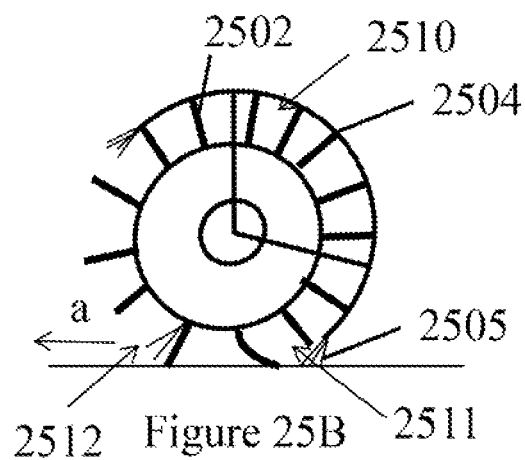

During operation of the brush assembly (2500), the bristles (2502) contact the surface that is being cleaned, such as a solar panel. When the bristles (2502) are un-flexed and the ends just touch the cover (2504), an area of atmospheric pressure (2510) occurs between sets of bristles (2502) as illustrated in FIG. 25B. When the bristles (2502) contact a surface, the bristles (2502) flex, reducing the amount of space between the flexed set of bristles (2502) the adjacent set of bristles (2502), which may cause an area of high pressure (2511) or compressed air between two adjacent sets of bristles (2002). The static bristles (2505) of the cover (2504) may help maintain the area of high pressure (2511) between adjacent bristles (2502) by trapping the air between the two sets of adjacent bristles (2502) rather than letting the air escape. When the bristles (2502) move from the flexed to un-flexed position, after contacting the surface, the high pressure region (2511) is transformed into a low pressure region (2512). The change between high pressure (2511) and low pressure regions (2512) causes a boost of compressed air, which increases the velocity of the dust and/or particulates being swept off the surface, which is designated by the direction "a" in FIG. 25B. The change between high pressure (2511) and low pressure regions (2512) may remove the dust and/or particulates from the surface at a faster rate without adding friction to the surface. The cover (2504) may rotate around the brush assembly (2500) when the brush assembly is moving, such that the static bristles (2505) are in contact with the surface being cleaned. The change from high pressure (2511) to low pressure (2512) as the flexed bristles un-flex may also reduce the amount of particulates that remain on the bristles (2502).

Details of one or more embodiments are set forth in the accompanying drawings and description. Other features, objects, and advantages will be apparent from the description, drawings, and claims. Although a number of embodiments of the invention have been described, it will be understood that various modifications may be made without departing from the spirit and scope of the invention. It should also be understood that the appended drawings are not necessarily to scale, presenting a somewhat simplified representation of various features and basic principles of the invention.

What is claimed is:
1. A cleaning apparatus, comprising:
a carriage assembly having a motor;
a trailing assembly, wherein the trailing assembly is pulled, behind the carriage assembly, by the carriage assembly;
a brush assembly comprising at least one rotatable brush having a rotational axis, wherein the brush assembly is attached with one end to the carriage assembly and with another end to the trailing assembly, wherein the carriage assembly is configured to translate, with the motor, the brush assembly and the trailing assembly, along a rail so that the trailing assembly trails behind the carriage assembly along the rail, and the rotational axis of the brush assembly makes an angle different than 90 degrees with the rail while the carriage assembly and the trailing assembly move along the rail, and wherein the brush assembly includes a telescoping shaft which is configured to expand and retract the brush assembly as the trailing assembly is trailing behind the carriage assembly.

2. The cleaning apparatus of claim 1, wherein the angle of the brush assembly relative to a solar panel changes when the telescoping shaft expands.

3. The cleaning apparatus of claim 1, wherein the telescoping shaft extends through a core of the brush assembly.

4. A track system for a cleaning apparatus, the track system comprising:
a rail comprising a first planar side, a second planar side, and a third planar side, wherein the first, second, and third planar sides are arranged to form at least two acute angles;
a carriage assembly comprising a drive wheel and at least two rollers, wherein the drive wheel is configured to contact the second planar side and is configured to translate the assembly along the rail;
a bracket configured to engage an underside of the rail and to support the rail; and
wherein the rail is configured to snap on to the bracket so that the bracket contacts at least two back regions of the first, second and third planar sides,
wherein a first roller of the at least two rollers is configured to contact the first planar side, and a second roller of the at least two rollers is configured to contact the third planar side and hold the assembly on the rail, and
wherein the carriage assembly attaches to the cleaning apparatus and translates the cleaning apparatus along the rail.

5. The track system of claim 4, wherein an end of the bracket is U-shaped.

6. The track system of claim 4, wherein the rail defines an open cross-section.

7. A track system, comprising:
a carriage assembly having a bracket, the bracket defining a first side, a second side, and a third side, a shaft extending between the second side and the third side and parallel to the first side, a drive roller positioned on the shaft, and a pair of rollers attached to corresponding ends of the bracket; and
a rail having a first side, a second side, and a third side, wherein the drive roller is configured to engage the first side of the rail and translate the carriage assembly along the rail,
wherein a first roller of the pair of rollers is configured to engage the second side of the rail and a second roller of the pair of rollers is configured to engage the third side of the rail,
wherein the first and second rollers are configured to attach the carriage assembly to the rail, and
wherein the carriage assembly attaches to a cleaning apparatus and translates the cleaning apparatus along the rail.

8. The track system of claim 4, wherein the first, second, and third planar sides are arranged to form at least two acute angles ranging between 50 degrees and 80 degrees.

9. The track system of claim 8, wherein the first planar side and the second planar side form an acute angle of approximately 70 degrees.

10. The track system of claim 8, wherein the second planar side and the third planar side form an acute angle of approximately 60 degrees.

11. A cleaning apparatus, comprising:
a carriage assembly;
a trailing assembly, wherein the trailing assembly is pulled, behind the carriage assembly, by the carriage assembly;
a brush assembly comprising at least one rotatable brush having a rotational axis, the at least one rotatable brush including a core defining a plurality of sockets, wherein one or more brush bristles extend from each of the plurality of sockets and the at least one rotatable brush is attached with one end to the carriage assembly and with another end to the trailing assembly; and
a drive attached to the carriage assembly, wherein the drive is configured to translate the brush assembly and the trailing assembly relative to a track,
wherein the drive is configured to translate the brush assembly and the trailing assembly, along the track so that the trailing assembly trails behind the carriage assembly along the track, and the rotational axis of the brush assembly makes an angle different than 90 degrees with the track while the carriage assembly and the trailing assembly move along the track.

12. The cleaning apparatus of claim 11, wherein the one or more brush bristles are removably attached to each of the one or more sockets.

13. The cleaning apparatus of claim 11, wherein the of sockets extend outwardly from the core.

14. The cleaning apparatus of claim 11, wherein the plurality of sockets extends inwardly toward the core.

15. A cleaning apparatus, comprising:
a brush assembly comprising at least one rotatable brush having a rotational axis, the at least one rotatable brush including a core and a plurality of sets of bristles extending outwardly from the core, the plurality of sets of bristles including at least a first set of bristles and a second set of bristles; and
a rotational cover surrounding at least a portion of the brush assembly, the rotational cover including one or more static bristles extending from edges of the rotational cover,
wherein the rotational cover rotates around the brush assembly based on the direction of the rotation of the brush assembly, and
wherein an area of high pressure is formed between a first set of the first set of bristles when the first set of bristles is in a flexed position, a second set of bristles adjacent the first set of bristles, and one or more static bristles.

16. The cleaning apparatus of claim 15, wherein the rotational cover surrounds at least 180 degrees of the brush assembly.

17. The track system of claim 15, wherein the rotational cover surrounds less than 180 degrees of the brush assembly.

18. The track system of claim 15, wherein an area of low pressure is formed between the first set of bristles and the second set of bristles when the first set of bristles moves between the flexed position and an un-flexed position.

* * * * *